July 28, 1942.  H. W. WILLIAMS ET AL  2,291,271
DISPATCHER CONTROLLED BANK OF CARS
Filed Feb. 16, 1940  10 Sheets-Sheet 8

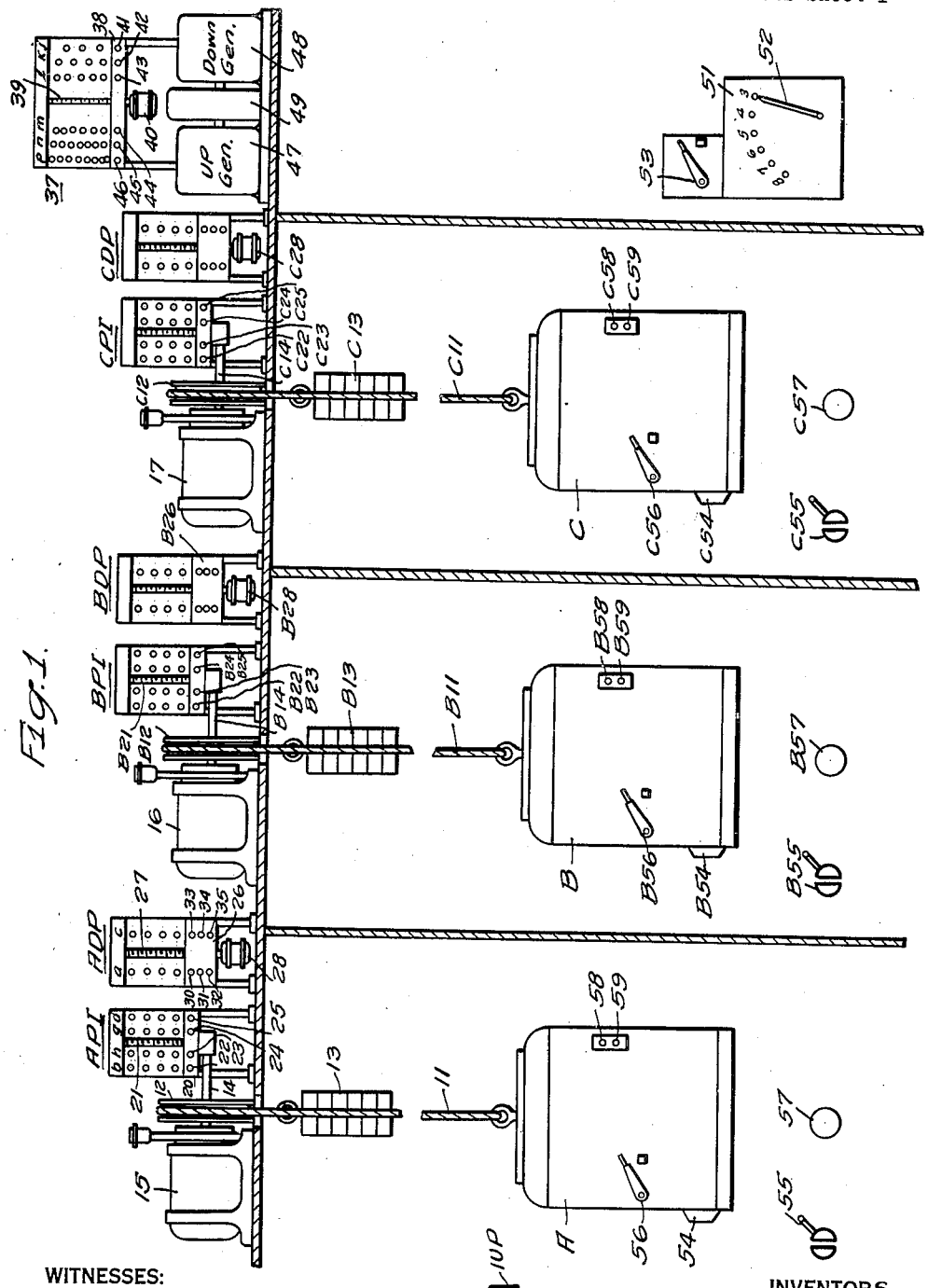

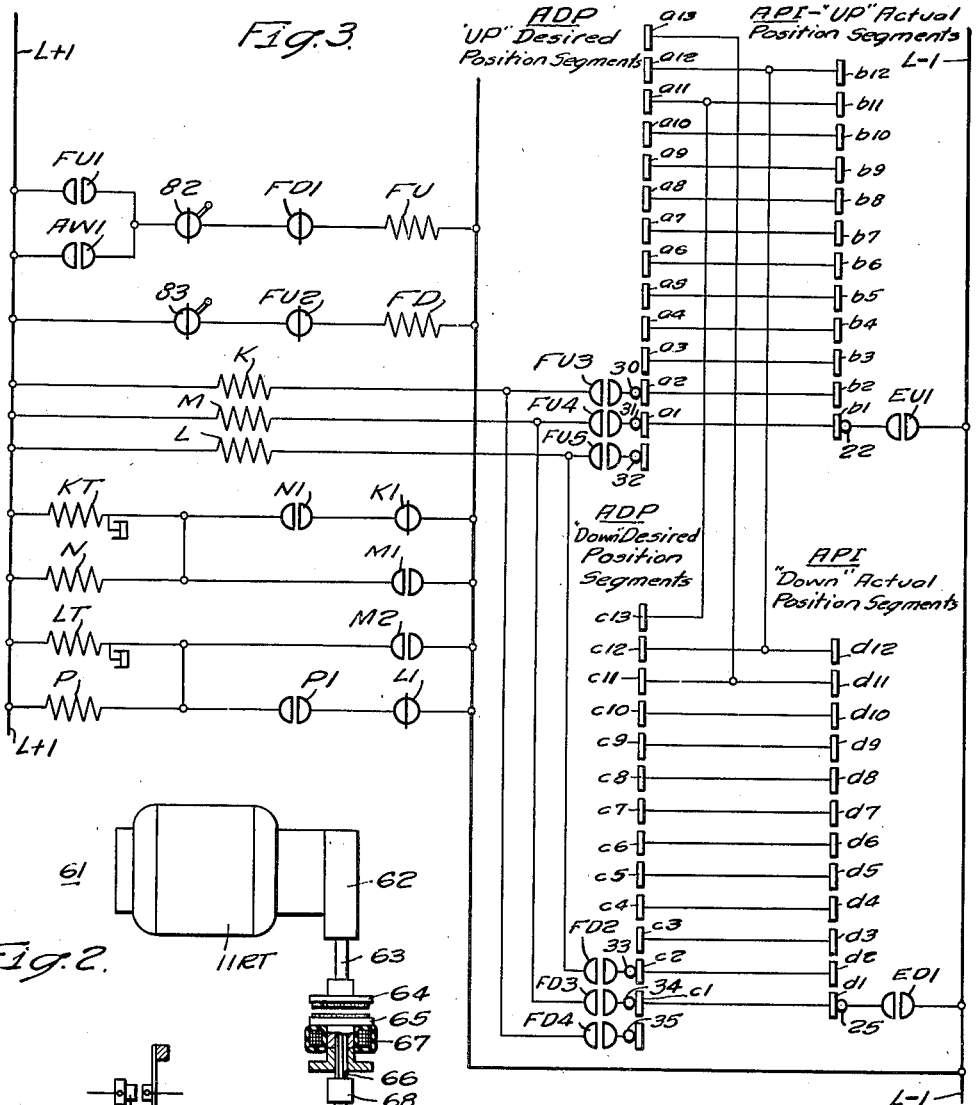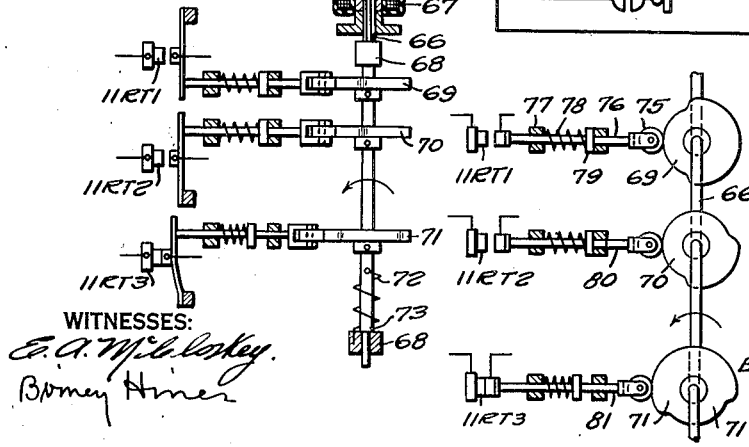

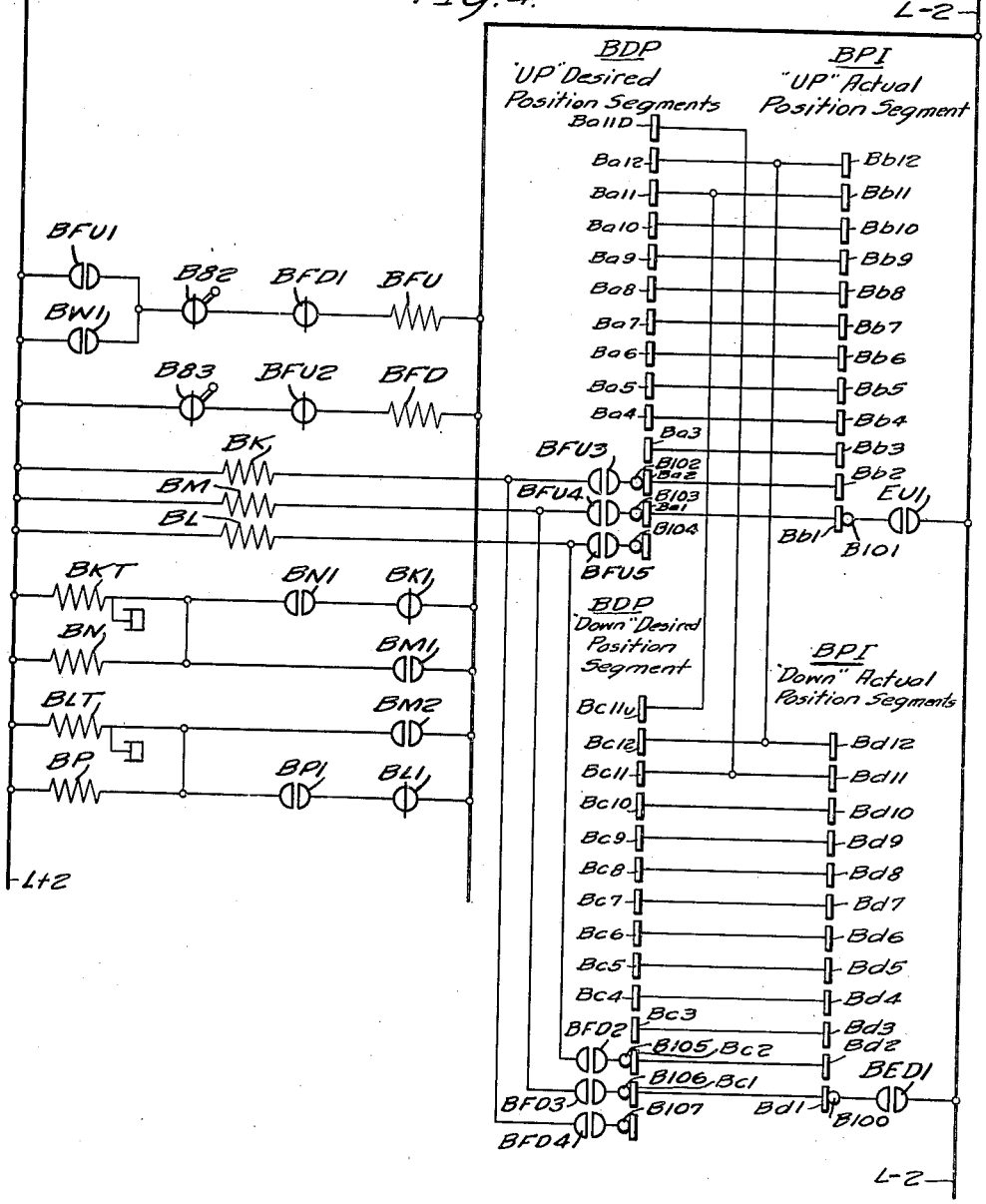

WITNESSES:

INVENTORS
Harold W. Williams, Edgar M. Bouton,
Danilo Santini, and William F. Eames.
BY
ATTORNEY Patented July 28, 1942

2,291,271

UNITED STATES PATENT OFFICE 2,291,271

DISPATCHER CONTROLLED BANK OF CARS

Harold W. Williams, Jersey City, Edgar M. Bouton, Nutley, Danilo Santini, Tenafly, and William F. Eames, Westfield, N. J., assignors to Westinghouse Electric Elevator Company, Jersey City, N. J., a corporation of Illinois Application February 16, 1940, Serial No. 319,286

40 Claims. (Cl. 187—29)

Our invention relates to elevator control and dispatching systems and, more particularly, to means for controlling the operation of the dispatching systems in accordance with the amount of traffic and to means for controlling the actions of the cars in answering stop calls in cooperation with the dispatching means.

In the operation of elevator systems difficulty has always been experienced in so dispatching and running the cars as to insure prompt service to all of the intending passengers. So far, regardless of what system has been used, it has been found that some passengers receive an immediate response to their stop calls while other passengers have to wait quite a long time for an answering car.

One object of our invention is, broadly, to reduce the average length of time necessary for the passengers to wait for cars after giving stop calls therefor; that is, to provide a system in which the time an intending passenger has to wait for his stop call to be answered will be neither short nor long, but will be, on the average, a reasonable wait, so that the intending passenger will, on the average, have a short wait for an answer. In other words, no passenger will receive an immediate answer to his calls but no passenger will be forced to wait very long for an answer to his call, thus giving, on the average, better service to the majority of the passengers.

A further object is to provide a system in which the giving of dispatching signals will be controlled in accordance with the ability of the cars to keep up with their schedules, that is, when a number of cars get ahead of time, the dispatching signals will be given at shorter intervals than normal and when a number of cars get behind time, the dispatching signals will be given at longer intervals than normal—the changes in the intervals varying in accordance with variations in the number of cars ahead of or behind their schedules.

Another object is to provide a system in which an "ahead of time" car will respond to any call, an "on time" car will respond only to calls which have been registered for at least a predetermined time (say fifteen seconds) and a "behind time" car will respond only to calls which have been registered for at least a greater predetermined time (say thirty seconds). The fifteen and thirty second intervals have been selected only for illustration and intervals of any other duration may be substituted therefor.

A still further object is to provide a system which will so respond to conditions that the cars ahead of their schedule will be given enough of the registered calls to slow them up with their schedules and the cars behind their schedule will be given a fewer number of registered calls so that they may catch up with their schedules.

It is also an object to provide a system which will keep the cars evenly spaced apart in their shaft travel and prevent them from becoming bunched.

For a better understanding of our invention, reference may be had to the accompanying drawings, in which:

Figure 1 is a representation in front elevation of a three-car elevator installation embodying our invention;

Fig. 2 is a representation of a timing motor and mechanism which may be used in connection with the control circuit for the motors;

Fig. 2C is a view in side elevation of one of the cams embodied in the timing motor illustrated in Fig. 7;

Figure 3A:
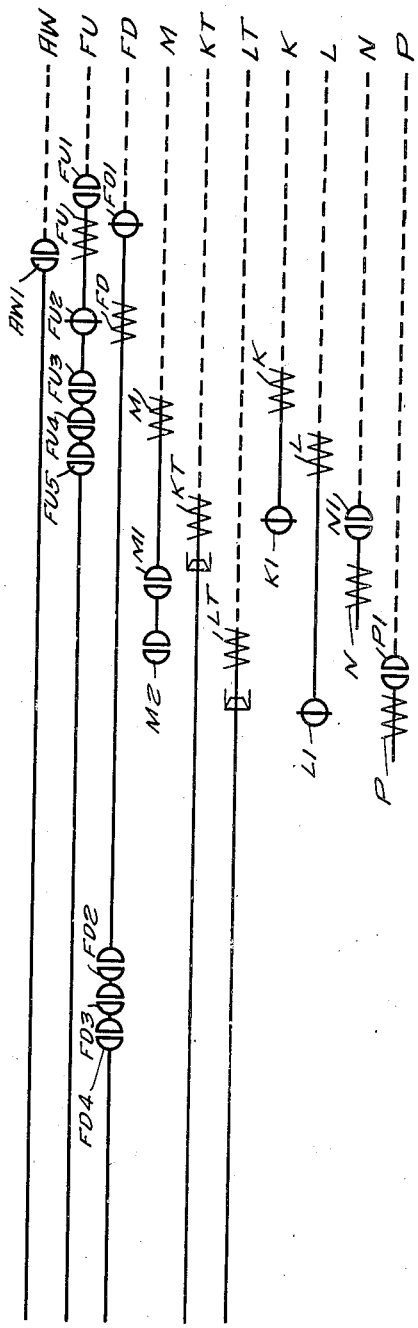
Figure 5:
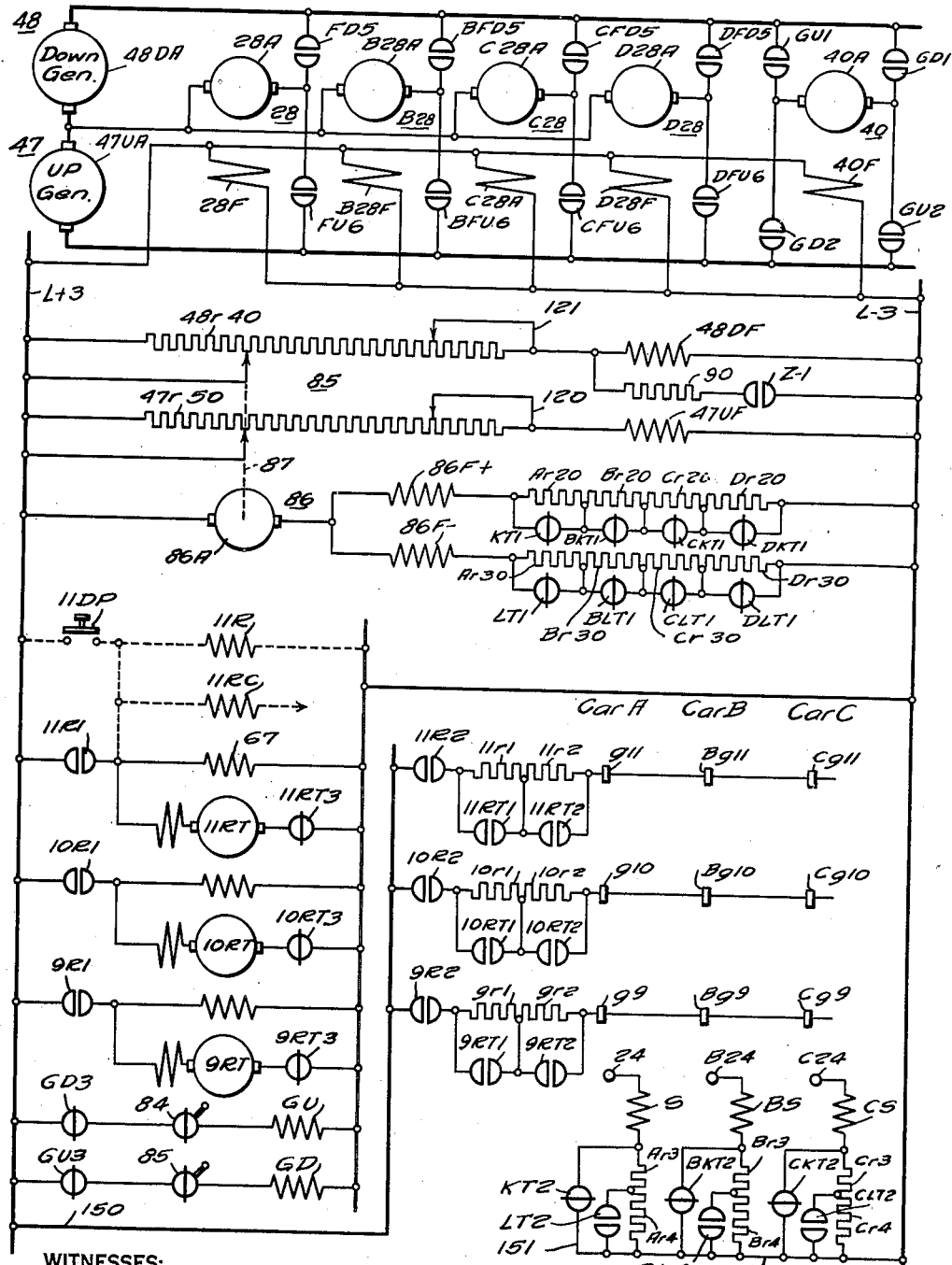
Figure 5A:
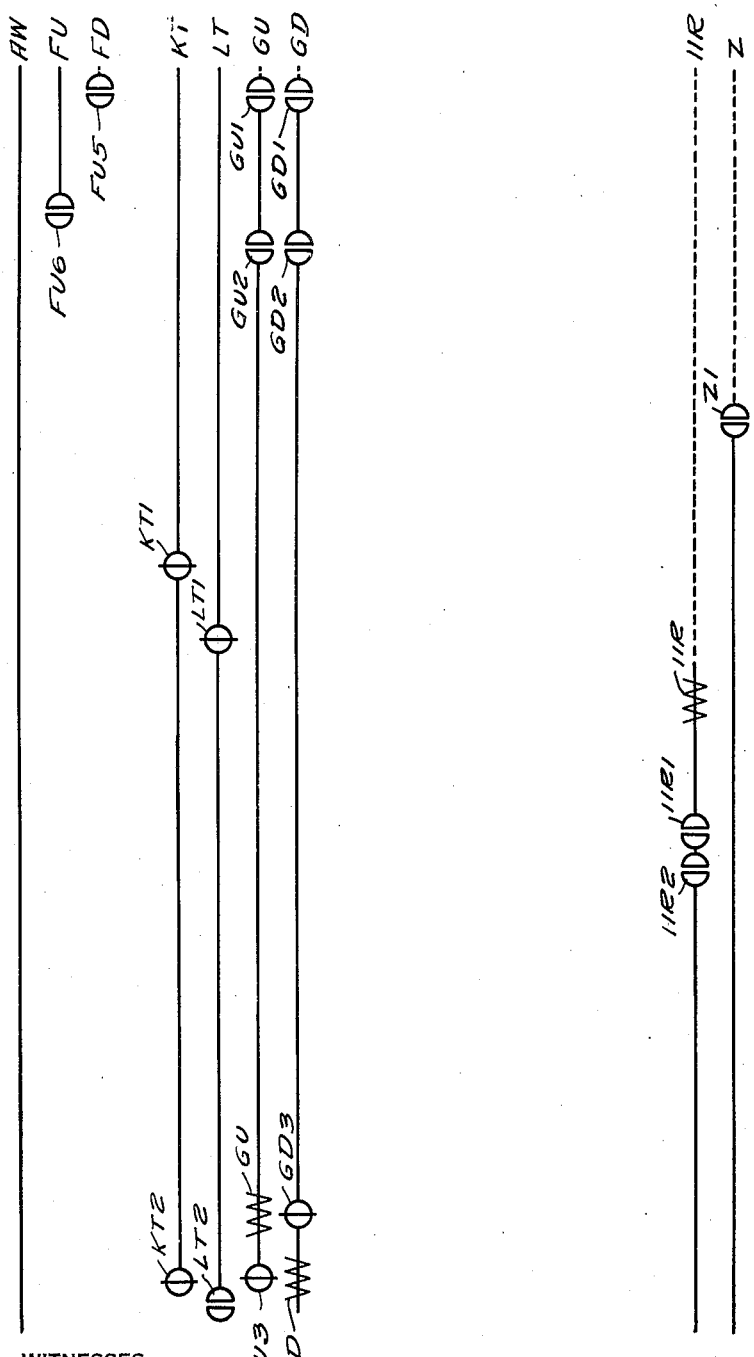
Figure 6:
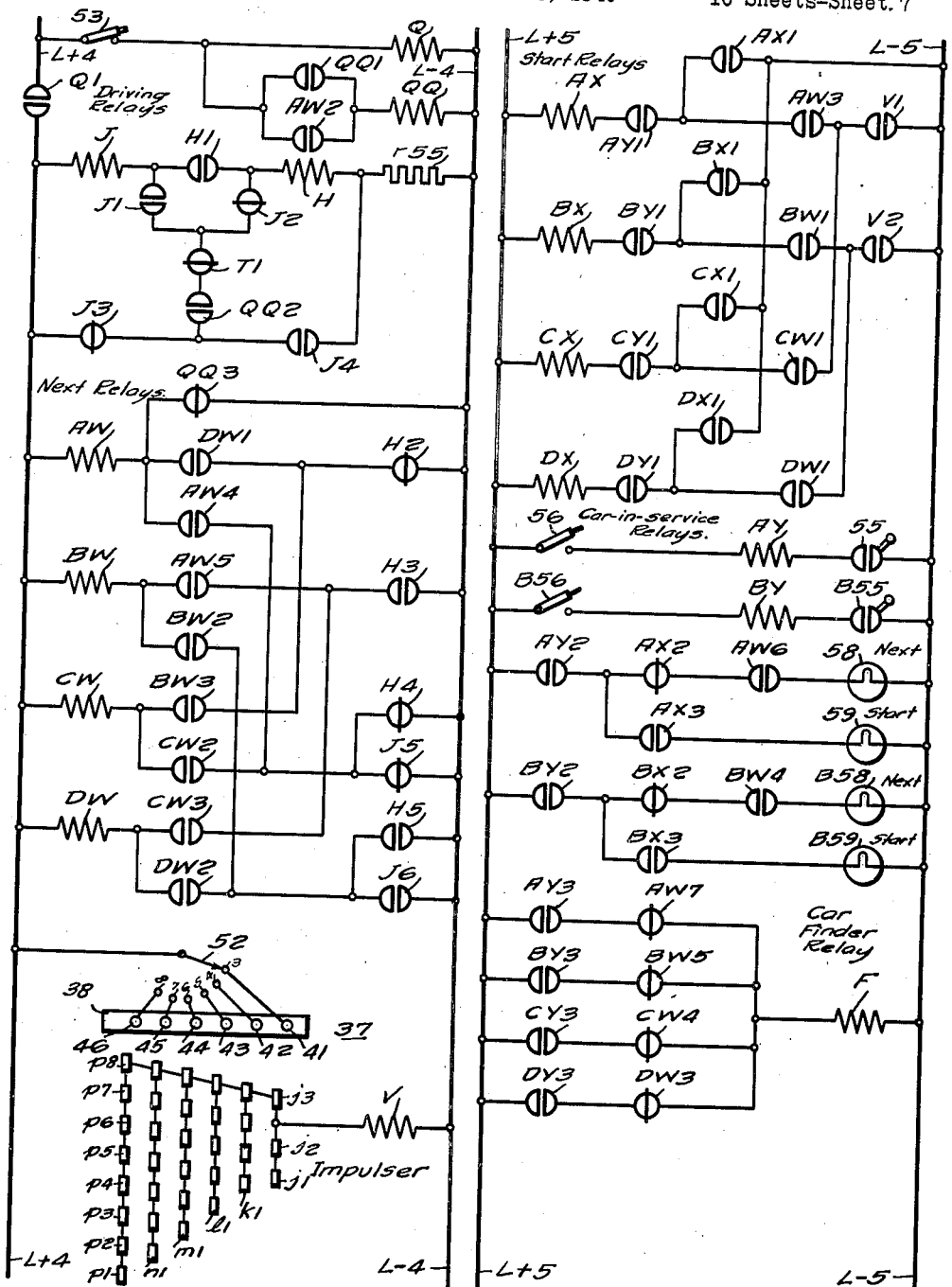
Figure 6A:
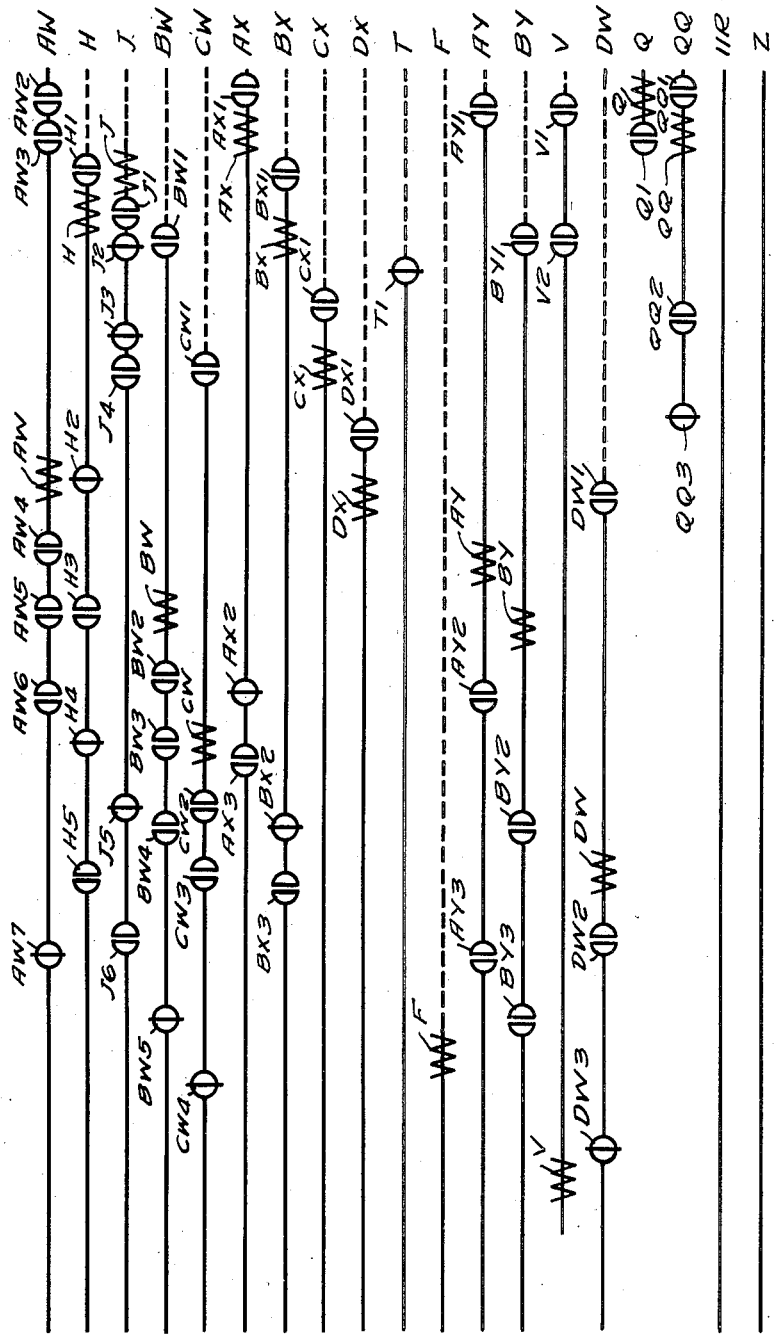

Figs. 3, 4, 5 and 6 collectively constitute a straight-line diagram of the control system for the elevator system illustrated in Fig. 1; and Figs. 3A, 5A, 6A and 7A provide a key representation of the relays embodied in the Figs. 2, 3, 4, 5 and 6, illustrating the coils and contact members of the relays disposed in horizontal alinement with their positions in the straight-line circuit so that their locations may be readily determined. On account of the large number of duplicate relays, the Figs. 3A, 5A, 6A and 7A do not show stems or shafts for all relays but they show those for one or two cars at least and from these the position and number of corresponding contact members and coils may be easily ascertained. For instance, in Figs. 6 and 6A, each of the four cars has a "start" relay, but Fig. 6A shows stems for the "start" relays AX and BX of cars A and B.

Relays

EU = up car running relay  
ED = down car running relay } When car starts on up or down trip, relay stays closed until end of trip.  
FU = up direction relay  
FD = down direction relay } Control direction of desired position selector.  
GU =  
GD = } impulse device direction relays.  
H =  
J = } driving relays for ring relays.  
K = "car ahead" relay.  
L = "car behind" relay.  
M = "car on time" relay.  
KT = timing relay for "car ahead" relay.  
LT = timing relay for "car behind" relay.  
N = holding auxiliary car-ahead relay.  
P = holding car-behind relay.  
S = "car-stopping relay."  
R = down call storage relay.  
AW  
BW  
CW  
DW } Chain or "next" relays (no time delay); one for each car.  
AX  
BX  
CX  
DX } "start" relays (no time delay); one for each car.  
T = timing relay for the chain driving relays H and J. Has time delay on opening.  
F = car finder relay for allowing T to drop out under condition that no car has the "next" signal.  
AY  
BY } "Car in service" relays. Energized when car is in service. One for each car.  
V = timing impulse relay for dispatcher.  
Q = main dispatcher starting relay.  
QQ = auxiliary starting relay for dispatcher.  
Z = generator field shunting relay.

Description of Fig. 1

Referring more particularly to Fig. 1 of the drawings, we have illustrated an elevator system embodying three cars, A, B and C, but the invention may be used in connection with an installation having any desired number of cars. The car A may be suitably suspended in its hatchway by a cable 11 which passes over a hoisting drum 12 to a counterweight 13. The hoisting drum 12 is mounted upon a shaft 14 operated by a hoisting motor 15. The cars B and C are suspended in a similar manner and are operated by hoisting motors 16 and 17, respectively.

The car A is provided with an actual position or position selector API and a desired-position or scheduling selector ADP for closing or opening certain circuits associated with the floors which the car serves as it runs up and down the hatchway. The actual position selector API is provided with an arm 20 mounted on a screw shaft 21 in position to move a plurality of brushes 22, 23, 24 and 25 over a plurality of stationary contact segments mounted on the selector. The up "actual" brush 22 engages contact segments under the letter b and the down "actual" brush 25 engages the contact members under the letter d, for connecting "actual" circuit contact segments to contact segments for corresponding floors on the desired position selector. The up contact segments under the letter h are "stop" segments, and are disposed to be engaged by the up stop brush 23 to cause up stops. The down stop contact segments under the letter g are disposed to be engaged by the down stop brush 24 to cause down stops. On this selector, the row of contact segments under each small letter contains one for each floor.

The screw shaft 21 is connected for operation by the hoisting motor shaft 14 so that the brush arm 20 will travel exactly in accordance with the movement of the car; that is, when the car is at any floor, the actual selector arm 20 will cause its brushes to engage the contact segments corresponding to that floor.

The desired-position selector ADP is provided with an arm 26 operatively mounted on a screw-threaded shaft 27 rotated by a motor 28. The arm 26 is provided with a plurality of brushes disposed to slide over a plurality of rows of stationary contact segments mounted on the selector, when the motor is operated, for the purpose of connecting certain circuits relating to the floors in accordance with the relative position of the car and the desired-position selector. The brushes on the arm 26 comprise an up "advance" brush 30, an up "on time" brush 31, and an up "behind time" brush 32 on the up side, and a down "advance" brush 35, a down "on time" brush 34, and a down "behind time" brush 33 on the down side. The motor 28 operates the desired-position selector independently of the position of car A, its direction is controlled by direction switches FU and FD and its speed is controlled by a plurality of comparing relays (shown in Fig. 3) responsive to the relative positions of the cars and their scheduling selectors but the motor 28 is designed to normally run at a predetermined speed.

The row of contact segments under the letter a contains one for each floor, and they are disposed to be engaged successively by the up "advance" brush 30, the up "on time" brush 31 and the up "behind time" brush 32. The row of down contact segments under the letter c contains one for each floor disposed to be engaged successively by the down "advance" brush 35, the down "on time" brush 34 and the down "behind time" brush 33 for the purpose of operating an "advance" relay, an "on time" relay, and a "behind time" relay for the car, to be hereinafter described.

Each of the other cars is provided with a similar actual-position selector and a desired-position selector, and each desired-position selector is operated by an independent motor.

An impulse giving mechanism 37 (common to all the cars) for the dispatching system is indicated in the upper right-hand corner of Fig. 1. This mechanism comprises an arm 38 mounted on a screw shaft 39 operated by a motor 40. The arm 38 is provided with a plurality of brushes 41 to 46, inclusive, disposed to wipe over a plurality of stationary contact members mounted on the frame of the impulse giving mechanism. The brushes engage the contact segments and thereby complete circuits to give dispatching impulses. Only one of the brushes on the impulse mechanism is electrically connected at one time, and that is the brush corresponding to the number of cars in service. The three contact segments under the letter j are disposed to be engaged by the brush 41 when three cars are operating; the four contact segments under the letter k by the brush 42 when four cars are in operation; the contact segments l by the brush 43 for five cars; the contact segments m by the brush 44 for six cars; the contact segments n by the brush 45 for seven cars; and the contact segments p by the brush 46 for eight cars. Each time a "live" brush engages a contact segment, it causes a dispatching impulse. (For the wiring diagram of these brushes and contact segments, see the lower left-hand corner of Fig. 6.) The arm 38 moves up and down at a normal predetermined rate of speed (regardless of the up and down direction of the cars) and at the end of each travel, it operates a limit switch to reverse its motor. The motor may be caused to vary in speed from its normal predetermined speed, by the operation of the schedule comparing relays, as will be later described.

The motors 28, B28 and C28 on the "desired-position" selectors and the motor 40 on the impulse mechanism are provided with energy for up direction operation by an up generator 47 and for down direction operation by a down generator 48. A motor 49 is provided for running the generators continuously at constant speed. Each of the motors for operating the "desired-position" selectors is connected to the up or to the down generator in accordance with operation of its direction switches FU and FD.

In the lower right-hand corner of Fig. 1 is indicated a presetting panel 51 for setting the impulse mechanism to give a number of dispatching impulses each cycle corresponding to the number of cars in service. The device has a switch arm 52, which may be moved by a dispatching attendant to the proper point for electrically connecting the brush corresponding to the number of cars in service, for operation over the row of contact segments for that number of cars. The contact points for the switch arm 52 are marked with the numerals 3, 4, 5, 6, 7, 8, 9 and 10 to indicate the number of cars the brush connected therewith and its cooperating row of contact segments will serve. The circuit for this device is shown in Fig. 6.

Figure 7:
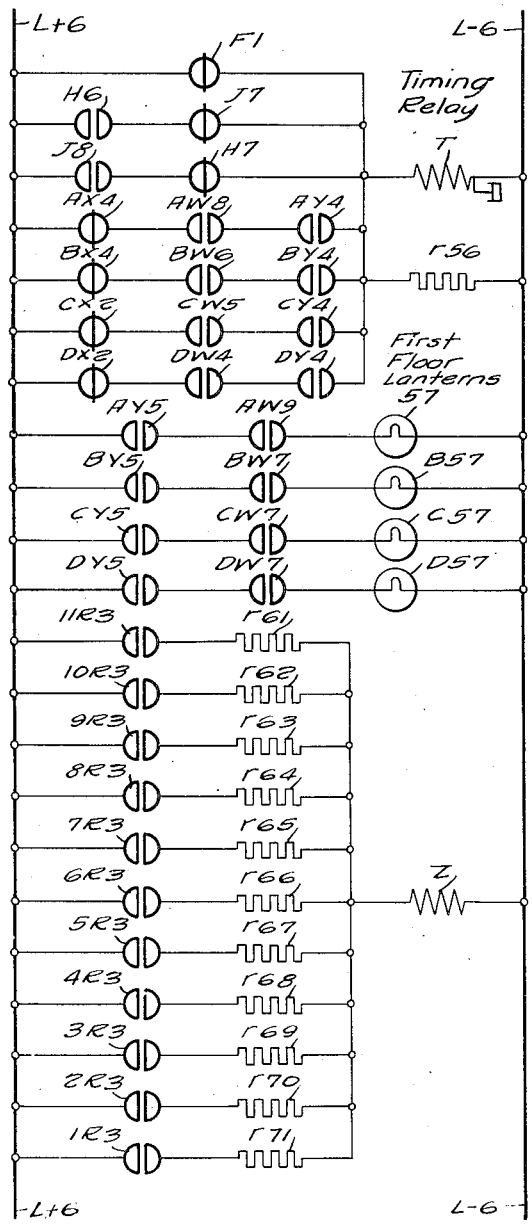
Figure 7A:
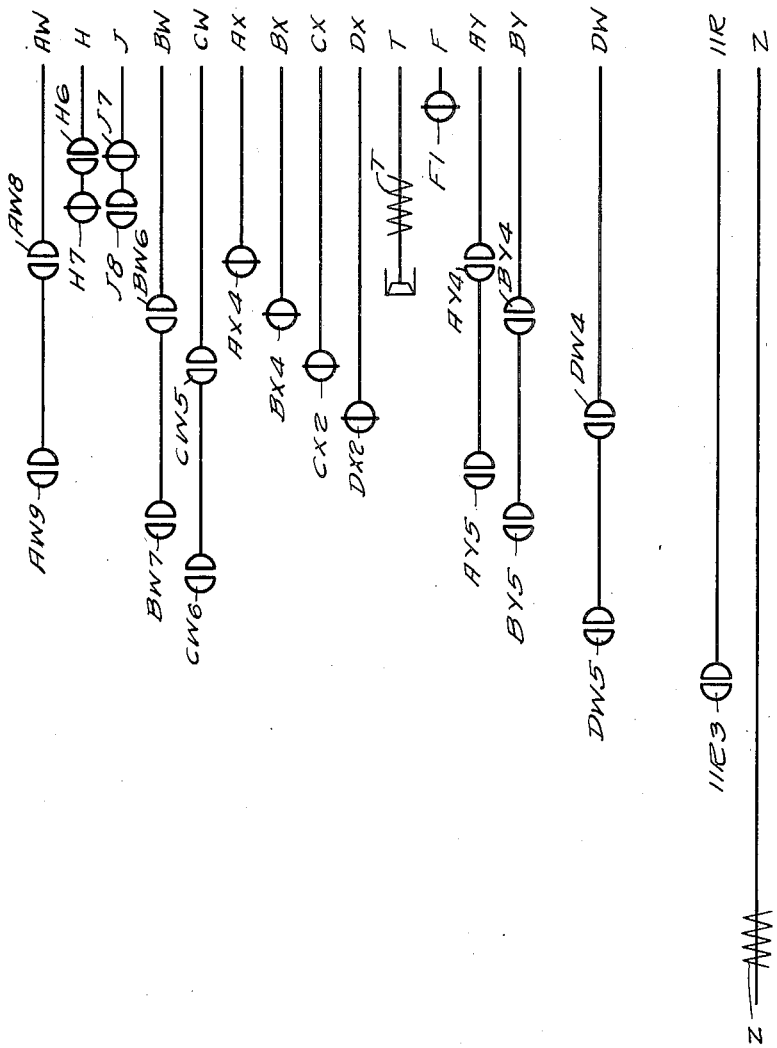

A manually operated switch 53 is disposed just above the presetting device 51 for starting into operation the dispatching system illustrated in Figs. 6 and 7.

The switch 53 and the presetting panel should be located at the dispatching station for ready operation by the dispatching attendant. It will be assumed in this case that the dispatching station is the first floor but it may be located at any desired floor.

The car A is provided with a cam 54 for moving a limit switch 55 to its closed position whenever the car reaches the dispatching floor. This limit switch is provided for preparing a circuit for the "car in service" relay AY (Fig. 6) of car A. Each of the other cars is provided with a similar cam and limit switch for preparing the circuit of its "car in service" relay.

A manually operated "car in service" switch 56 is mounted in car A for conditioning the circuit of the relay AY to be energized by the closing of the limit switch 55 when the car is at the dispatching floor. Each of the other cars is provided with a similar manually operated switch for the same purpose.

A floor lantern 57 is provided at the first floor for car A to indicate to intending passengers when that car is "next" to leave. Each of the other cars is provided with a similar floor lantern.

A "next" signal lamp 58 and a "start" signal lamp 59 are mounted in car A. The "next" lamp is lighted when the car is at the dispatching floor and is selected as the next car to leave on its trip. The "start" lamp is lighted to give the attendant the signal to start. Similar signal lamps are mounted in the other cars.

Description of Figs. 2 and 2C

This system will be used with stop call registering relays (shown in Fig. 5), each of which will have a timing motor mechanism. A timing motor mechanism is illustrated in Fig. 2 for use in connection with the downstop call registering relay for the eleventh floor operated by a push-button at that floor, so that certain contacts will be closed after the expiration of predetermined time intervals after a stop call is registered. The timing motor mechanism 61 comprises an electric motor 11RT connected by a gear reducing unit 62 to operate a shaft 63 upon the outer end of which is disposed a clutch facing 64. A clutch facing 65 is slidably disposed on the splined end of a shaft 66 in position to be moved axially into engagement with the clutch facing 64 by an electromagnet 67. The shaft 66 may be supported by a plurality of bearings 68 and has mounted upon it three cam wheels 69, 70 and 71. A spiral spring 72 is coiled around the shaft 66 with one end affixed to the shaft and the other end affixed to the outer bearing 68. When the motor is energized and the clutch is engaged, the motor rotates the shaft 66 and its cam wheels against the spring. When the clutch is released, the spring returns the shaft and the cam wheels to their original starting position to make a new start when the clutch and motor are again energized. Fig. 2C is a diagrammatic representation of the cam wheels 69, 70 and 71 in side elevation. The cam wheel 69 is disposed to engage a roller 75 for longitudinally operating a shaft 76 slidably mounted in a pair of bearings 77 to close a pair of contact members 11RT1. A coil spring 78 is disposed on the shaft to bias the roller 75 against the outer periphery of the cam 69. The cam 70 operates a contact arm 80 in a similar manner for closing a pair of contact members 11RT2. The cam wheel 71 is disposed to operate a contact arm 81 for opening a pair of contact members 11RT3.

The timing mechanism 61 is so constructed that it will, when energized by energization of the stop call relay, cause the shaft 66 to make one complete revolution in one minute. The cam surfaces of the wheels are so proportioned that the cam wheel 69 will move from the position indicated in Fig. 2C to the point where its cam surface closes the contact members 11RT1 at the end of fifteen seconds; the cam wheel 70 will close the contact members 11RT2 at the end of thirty seconds; and the cam wheel 71 will rotate into such position as to open the contact members 11RT3 just after the contact members 11RT2 close at the end of, say, thirty-one seconds. The cams are adjustable on the shaft and may be set for any other intervals as desired. For instance, the first cam may be set to close its contact members at ten seconds, the second cam set to close its contact members at twenty seconds, and the third cam set to open its contact members at twenty-one seconds. A similar timing mechanism is associated with each call registering relay.

Description of Fig. 3

The up direction relay FU and the down direction relay FD are illustrated in the upper left-hand corner of Fig. 3 for controlling the direction of operation of the "desired-position" selector of car A and also for connecting the circuits to the brushes on the "desired-position" selector in accordance with the direction of operation of the selector.

The up relay FU is started in operation by the "next" relay AW of the dispatching system closing its contacts AW1. When the selector reaches its upper terminal, it opens its top limit switch 82 and thereby causes the down direction relay FD to be energized, and when the selector reaches the bottom terminal, it opens its bottom limit switch 83 to deenergize the relays FD and prepare relay FU for the next operation, thus completing one cycle of operation. Relay FU will not be energized again until after car A is again indicated as the "next" car to receive the dispatching signal.

The right-hand portion of Fig. 3 illustrates the electrical connection of the rows of "up" contact segments $a$ on the desired-position selector ADP to the "up" contact segments $b$ on the actual position selector API, and the electrical connection of the "down" contact segments $c$ on the desired-position selector ADP to the "down" contact segments $d$ on the actual-position selector API. For instance, the "up" contact segment $a8$ for the eighth floor on the selector ADP is electrically connected to the "up" contact segment $b8$ for the eighth floor on the selector ADI.

The schedule comparing relays are the "car ahead" relay K, the "car on time" relay M and the "car behind time" relay L. The "car ahead" relay K is electrically connected between the supply conductor L+1 and the up advance brush 30 and the down advance brush 35. The "car on time" relay M is electrically connected between the conductor L+1 and the up "on time" brush 31 and the down "on time" brush 34. The "car behind" relay L is electrically connected between the supply conductor L+1 and the up "behind time" brush 32 and the down "behind time" brush 33. When the scheduling selector operates in the up direction, the relay FU is energized to connect these relays to the up brushes 30, 31 and 32 by means of front contacts FU3, FU4, FU5. When the scheduling selector is operating in the down direction, these relays are electrically connected to the down brushes 35, 34 and 33 by the front contacts FD2, FD3 and FD4 of down relay FD by means of front contacts FU3, FU4, FU5.

The supply conductors L+1 through L+6 represent a continuous circuit and are given their different numbers so that they may be referred to easily.

An ahead timing relay KT is provided for the "car ahead" relay K, and a behind timing relay LT is provided for the "car behind" relay L. Associated with the relay KT is an auxiliary car ahead relay N, and associated with the relay LT is an auxiliary car behind relay P. These relays are controlled by the relays K, M and L. When the car A is on time, the on-time relay M is energized, thus energizing the relays KT and N, and LT and P. If car A moves ahead of its schedule, the relay M is deenergized and the relay K is energized, thereby deenergizing the relay N and also the timing relay KT which is provided with a dashpot or time delay device to delay its opening for, say, five seconds after it is deenergized. This delay is provided to prevent "trigger" action of the relay so that the car will be really ahead of its schedule before the relay opens. In the meantime, relay P holds in relay LT, but if car A drops behind its schedule, it deenergizes relay M and energizes relay L, thereby deenergizing relay P and relay LT which times out after say, five seconds, but relay N now holds in relay KT.

It is to be understood that each car has a similar group of schedule comparing relays.

Description of Fig. 4

The wiring diagram given in Fig. 4 is for car B and corresponds to the wiring diagram of the schedule comparing relays shown in Fig. 3 for car A.

Description of Fig. 5

The electrical connections for the down generator 48 and the up generator 47, together with the motors 28, B28, C28, and D28 for driving the desired-position selectors and for the motor 40 for driving the impulse mechanism 37 (Fig. 1) are illustrated in the upper part of Fig. 5. The down generator 48 is provided with an armature 48DA and a field winding 48DF. The up generator 47 is provided with an armature 47UA and a field winding 47UF. The motor 28 for the desired-position selector of car A is provided with an armature 28A and a field winding 28F. The motors for the cars B, C and D are provided with similar armatures and field windings. The field winding 28F is connected to the supply conductors L+3 and L—3. The armature 28A is disposed to be connected in the circuits of the up generator armature 47UA or the down generator armature 48DA by the closing of the contact members of either the up direction relay FU or the down direction relay FD in accordance with the direction of operation of car A. The desired-position motors for the other cars are connected in a similar manner. The impulser motor 40 has its armature 40A connected to the circuits of the armatures of the down generator and the up generator by the contact members of an up limit relay GU and a down limit relay GD controlled by upper and lower limit switches 84 and 85 which are operated by the crossarm on the impulse device when it reaches its upper or its lower limit of travel. The field winding 40F of the impulser motor is connected across the line conductors L+3 and L—3 for constant energization. The crossarm operates continuously and reverses at the end of each up or down operation.

The speed of the desired-position motors 28, B28, C28 and D28 and the impulser motor 40 is controlled by the voltage of the generators 47 and 48 which in turn is controlled by a motor operated rheostat 85, which, in turn, is controlled by the schedule comparing relays K, M and L which respond to the actual and to the scheduled positions of the cars.

A motor operated rheostat 85 is provided for so controlling the field windings of the generators as to vary their voltage, and hence the speed of the desired-position motors and the impulser motor. The rheostat comprises a resistor 48r40 disposed in series with the generator field winding 48DF, a resistor 47r50 disposed in series with the up generator field winding 47UF, and a motor 86 for increasing and decreasing the value of the resistors. The motor has an armature 86A and a pair of field windings 86F+ and 86F—. The armature 86A is connected to operate a rheostat arm 87 to vary the value of the resistor 48r40 and the value of the resistor 47r50.

The field windings 86F+ and 86F— of the rheostat motor 86 are connected in series with the armature 86A and in parallel with each other but are wound to oppose each other. As long as they oppose each other with equal strength, the motor will not rotate in either direction, but when the value of one field is increased over the value of the other field, the motor will be operated to move the resistor arm 87 in the corresponding direction to increase or decrease the voltage of the generators. The means for controlling the value of the resistor motor field winding 86F+ comprises a plurality of resistor sections Ar20, Br20, Cr20 and Dr20 connected in series with that field winding and controlled by contact members operated by the "ahead of time" relays KT. For instance, when car A gets ahead of its schedule, it deenergizes its advance relay KT to open its back contact members KT1, thus inserting the resistor section Ar20 in series with the field winding 86F+ for the purpose of increasing the voltage of the generators. When car A gets behind its schedule, it operates its "behind time" relay LT to open its back contacts LT1 and thereby insert the resistor Ar30 in series with the field winding 86F— to decrease the voltage of the generators. Each of the other cars effects the same control.

An adjustable arm 120 is attached to the up resistor 47r50, and a similar adjustable arm 121 is attached to the down resistor 48r40. These arms are independent of each other and may be adjusted manually to set the predetermined time of the up trip operation and the down trip operation of the desired-position selectors, and also the speed of the dispatching impulser, as desired. For instance, the arms may be moved to the left to decrease the active lengths of the resistors 47r50 and 48r40. This adjustment will increase the strength of the generator fields 47UF and 48DF, thus causing the generators to increase their voltage and thereby cause the desired-position selector motors 28, B28, etc., and the impulser motor 40 to increase their speed to cause the desired-position selectors to decrease the predetermined round trip time of the selectors and to cause the dispatching signals to be given at more frequent intervals. On the other hand, the arms may be moved to the right to thereby increase the active lengths of the resistors in series with the generator field windings, and thereby decrease the strength of the field windings, thus decreasing the voltage of the generators and consequently the speed of the desired-position selector motors and the impulser motor. This will cause the predetermined round trip time of the desired-position selectors to be decreased and also cause the dispatching impulser to give the dispatching signals at less frequent intervals.

It will also be evident that the up arm 121 may be moved to the left to decrease the active portion of the resistor 47r50, and the arm 120 may be moved to the right to increase the active portion of the resistor 48r40, for the purpose of causing the predetermined up trip time of the desired-position selectors to be faster than their predetermined down trip time, or the position of the arms may be reversed to cause the predetermined up trip time to be longer than the predetermined down trip time. In fact, the arms may be adjusted independently to secure many desirable variations in the predetermined speeds of the desired-position selectors.

A resistor 90 is disposed in shunt relation to the generator field winding 48DF and controlled by a pair of contact members Z1 for decreasing the voltage of the down generator 48 when more than a predetermined number of down stop calls (say six) are registered at one time. The contact members Z1 are controlled by a field shunting relay Z, as indicated in Fig. 7. This relay decreases the voltage of the down generator which slows the down trip operation of the desired-position selector or selectors of the down cars, when the down calls pile up, without waiting for the slow correction which would ultimately occur when the cars fall behind due to too many stops.

Our improved system may be applied to any number of cars, but the connections just described are indicated as applied to four cars A, B, C and D.

The invention may be used in connection with any suitable elevator control and signalling system. For the purpose of illustration, it is shown as applied to an elevator control system such as is described and illustrated in the Frank E. Lewis Patent No. 2,005,899, issued June 25, 1935, on elevator control and signalling systems. In this patent, a plurality of pushbuttons are provided at the landings for the passengers to operate in order to register stop calls to cause the next car in their direction to stop for them. When a stop call is registered by the operation of the pushbutton, it causes a stopping segment on the floor selector of each car to be energized. Each car is provided with a stopping relay, and the next available car for a registered stop, in approaching that stop, causes its stopping brush to engage the energized stopping segment and thereby energize its stopping relay. The energized stopping relay then effects the automatic stopping of the car at the floor at which the stop call was registered. The stopping relay in the above named patent for car C is designated as 7y.

In our Fig. 5, we have shown only a small portion of such a car controlling system by indicating a down stop pushbutton 11DP for the eleventh floor and a call registering or call storing relay 11R disposed to be energized by the operation of this button and thereby register or store a call until a car comes along and answers it. A cancellation coil 11RC is provided for cancelling the call registered or stored on the relay 11R when the car stops at a floor in answer to a registered call. The circuits for the button and these two coils are indicated by dotted lines as an example of what may be used. The call registering relay 11R controls a pair of contact members 11R1 for establishing a self-holding circuit for itself and a pair of contact members 11R2 for connecting the stopping segments g11, Bg11, and Cg11 on the actual position floor selectors for cars A, B, and C. No segment is shown for car D as it is believed that the three segments shown will be sufficient to illustrate the system.

The pushbutton 11DP and registering relay 11R are common to all the cars.

This figure also shows the wiring connections for the clutch coil 67 and the timing motor 11RT shown in Fig. 2 for operation by the call registering relay 11R. As stated in connection with Fig. 2, when a call is registered on relay 11R, the motor 11RT starts the shaft 66 to rotate the cams 69, 70, and 71 to close the timing contact members 11RT1 at the end of fifteen seconds and the timing contact members 11RT2 at the end of thirty seconds. No buttons or call registering relays are shown for the other floors but the wiring connections for the timing motors 10RT and 9RT for the down call registering devices for the tenth and the ninth floors are illustrated in connection with the wiring circuits for those floors.

The car A is provided with a stopping relay S connected in series with its down stopping brush 24 so that when that brush engages an energized down stop segment, for instance, g11, relay S will be energized sufficiently (under certain conditions hereinafter described) to effect the stopping of that car. Car B is provided with a stopping relay BS connected in series with its stopping brush B24 and car C is provided with a stopping relay CS disposed in series with its stopping brush C24 so that the first car to approach an energized stopping segment in the right direction will be stopped at the floor of the registered call by the energization of its stopping relay sufficiently to cause it to pick up.

In our improved system, we desire to so control the stopping of the cars in answer to registered stop calls that a car ahead of its schedule will stop for a registered call as soon as the call is registered; a car on its schedule will not stop in answer to a registered call until that call has been registered for at least a predetermined length of time; and a car behind its schedule will not stop for a registered call unless the call has been registered for at least a longer predetermined time, but any car will answer any call it approaches which has been registered more than a predetermined time, say 30 seconds.

In order to accomplish this result, we include two resistor sections in series with each set of stopping segments and two resistor sections in series with the stopping relay of each car. The two resistor sections disposed in series in the stopping circuit of the down call registering relay 11R at the eleventh floor are indicated by the reference characters 11r1 and 11r2. The two resistor sections in circuit with the other floor call registering relays are given the same marking according to the floor they represent. The resistor sections disposed in series with the stopping relay S of car A are indicated by the reference numerals Ar3 and Ar4; those for car B as Br3 and Br4, and those for car C as Cr3 and Cr4. Means are provided for short-circuiting these resistors in accordance with the conditions mentioned above. The resistors are of such value and the stopping relays are so wound that the stopping relay of a car will not be energized to stop that car unless at least two of the four resistors in the circuit through the stopping relay are short-circuited.

The means for short-circuiting the resistor section $11r1$ are indicated as the contact members $11RT1$ operated by the cam wheel 69 on the timing motor $11RT$ at a predetermined time interval, say 15 seconds, after a call is registered. The means for short-circuiting the resistor $11r2$ are the contact members $11RT2$ disposed to be closed by the cam wheel 70 after the expiration of a predetermined time interval say, thirty seconds after a call is registered. The resistor $Ar3$ in the stopping circuit of car A is controlled by the back contact members KT2 of the car ahead, timing relay KT when that car is ahead of its schedule, so that this resistor section will be short-circuited only when car A is ahead of its schedule. The resistor section $Ar4$ in the stopping circuit of car A is controlled by the contact members LT2 of the car behind timing relay LT of car A so that that resistor will be short-circuited except when the car is behind time. The resistor sections in the stopping circuits of each of the other cars are controlled in a like manner.

Hence, it will be evident that if car A is ahead of its schedule and approaches the eleventh floor stopping segment $g11$, when it is energized, the stopping relay S will be energized to stop that car even if the call has just been registered and the timing motor for that call registering device has not yet had time to close its contact members $11RT1$, because the contact members KT2 will be closed, thereby shorting the resistor sections $Ar3$ and $Ar4$. It will also be obvious that as car A approaches the energized segment $g11$ when it is on time and more than 15 seconds but less than thirty seconds after a stop call has been registered, the resistor section $11r1$ will be short-circuited by the closed contact members $11rT1$ and the resistor section $Ar4$ will be short-circuited by the closed contact members LT2, thus causing the car to answer the call because it is on time and the call has been registered more than 15 seconds. On the other hand, if the car is behind time, the contact members KT2 and LT2 will be open and the car will not answer the call unless it has been registered more than 30 seconds, at which time both contacts $11RT1$ and $11RT2$ will be closed to short the resistors $11r1$ and $11r2$.

The lower left hand corner of Fig. 5 illustrates the impulse device direction relays GU and GD controlled by the upper limit switch 84 and the lower limit switch 85 for reversing the impulser arm 38 at each end of its movement. The top limit switch 84 is operated by the impulser at the end of its up travel. The bottom limit switch 85 is operated by the impulser at the end of its down travel.

*Description of Figs. 6 and 7*

Our improved system may be used with any suitable dispatching system. For the sake of illustration, it is shown as applied to a dispatching system such as is illustrated by the relays and electrical connections given in Figs. 6 and 7. This system is of the non-rotational type in which the first car to arrive at the dispatching floor may receive the next dispatching signal, as contrasted with rotational systems in which each car must follow its turn in leaving the dispatching floor, even if some other car arrives ahead of it.

Fig. 6 embodies the switch 53 for connecting the dispatching system to the main line, and main line starting relay Q and auxiliary starting relay QQ for starting the dispatching system in response to a closing operation of the switch 53. Fig. 6 also includes a plurality of chain or "next" relays AW, BW, CW and DW (one for each car) for operating the "next" signal lamps 58, B58, C58 etc.; a pair of driving relays J and H for operating the chain relays; the wiring connections for the impulse device 37 and the timing impulse relay V operated thereby; a plurality of "start" relays AX, BX, CX and DX, (one for each car) for selectively preparing the circuits for the "start" lamps to be completed by the impulse relay V; the "car in service" relays AY, BY, etc. (one for each car); and the car finder relay F.

Fig. 7 shows the wiring connections for a timing relay T which starts and stops the driving relays H and J; the circuits for the first floor lanterns 57, B57, etc., and the circuit for the shunting relay Z.

The relay chain (Fig. 6) comprising the "next" relays AW, BW, CW and DW, together with the chain driving relays J and H, is provided for successively energizing the next to start lamps 58, B58, etc., of the various cars at the intervals suitable for the normal operation of the bank of cars. The open or closed condition of the chain driving relays J and H is determined by the open or closed condition of the chain timing relay T, which latter is designed to close substantially instantaneously upon energization of its operating coil but to remain in operated condition, after deenergization of its operating coil, for a short time interval, which may be assumed, for purpose of illustrations, as one quarter second. The desired time interval may be secured by any suitable means such as a resistor $r56$ connected in parallel with the operating coil to provide an inductive discharge circuit for the coil upon disconnection of the latter from the supply conductors L+6 and L−6. The timing interval of one quarter second may be changed to any other interval if desired. For instance, in some systems it may be more desirable to provide a timing interval of one-half second.

The chain timing relay T is controlled by one circuit including back contacts of the car finder relay F; by two parallel circuits including contacts of each of the chain driving relays J and H, and also by a number of parallel circuits (one for each car), each of which includes front contact members such as AW8 of the corresponding "next" down relay, the back contact members such as AX4 of the corresponding "start" relay and the front contacts AY4 of the "car in service" relay of the car corresponding to that circuit.

The chain relays AW, BW, CW and DW; the driving relays J and H; and the timing relay T, operate generally as follows: When no car is at the dispatching floor, the relays T, J and H are inactive, but, when a car is at the floor and ready for a "next" signal, that car energizes the car finder relay F to open its contacts F1, thus deenergizing the relay T to close its contacts T1 and thus start the driving relays J and H to open and close successively and thus operate the "next" relays AW, BW, CW and DW successively until they reach the "next" relay for a car at the dispatching floor, when one of the car parallel circuits to the relay T is completed to energize relay T and keep it energized until the selected car gets a "start" signal for stopping the driving relays and keep them from operating until another car is to be selected for a dispatching signal.

In order to prevent short circuits between the supply conductors and, under certain conditions of operation, of the chain driving relays J and H, a resistor $r55$ is provided in series with the operating coils of the latter relays.

The car finder relay F (Fig. 6) is energized to deenergize the relay T whenever a car is at a floor and its chain relay has not yet been operated to select it as the next car to receive the dispatching signal. The relay F controls the timing relay T to open its contacts T1 to stop the driving relays, and hence stop the operation of the chain relays, as soon as a car is selected as "next" at the dispatching floor.

The first floor lantern of a car (say 57 for car A) is lighted whenever that car is at the dispatching floor and its chain relay has been operated to select it as the next car to receive the dispatching signal.

The shunting relay Z is provided as indicated in connection with Fig. 5, for completing shunt connection around the field winding 48DF for the down generator whenever a predetermined number of down stop calls stand registered at one time. The circuit for the relay Z includes, in parallel, a plurality of resistors $r61$ to $r71$, inclusive. Each resistor is associated with a call registering relay for a floor and is connected to permit current to pass through it whenever that call registering relay is energized for a stop call, as is indicated by the contact members 11R3 of the down call registering relay for the eleventh floor. The resistors and the relay Z are so proportioned that the relay Z will not be energized until it receives energy through a predetermined number of resistors. In the present case, this predetermined number has been selected as six, and when six down calls stand registered at any one time, sufficient energy will flow through the parallel resistors to energize the relay Z and thus cause it to close the shunt connection 90 around the down generator field winding 48DF to slow down the desired-position selector motors of the down cars, thus giving the down cars time to take care of the large number of down calls without getting far behind their desired-position selectors.

*Assumed operation of dispatcher*

In order to study the operation of the dispatching system illustrated in Figs. 1, 6 and 7, it will be assumed that the three cars A, B and C are standing at the first floor, which has been selected as the dispatching floor. Consequently, their limit switches 55, B55, and C55 are closed to prepare the circuits for their "car-in-service" relays. It will be assumed that the dispatching attendant at the dispatching floor closes the main line switch 53 (Fig. 6) for the dispatching system including conductors L+4, L—4, L+5, L—5, L+6, and L—6 and places the impulser arm 52 on the contact 3 for connecting the segments $j$—1, $j$—2, $j$—3 for operation, inasmuch as there are three active cars in the system.

The closing of the switch 53 energizes the starting relay Q which closes its contact members Q1 thus energizing the timing relay T, the "next" relay AW and the circuits of the impulser 37.

The relay T is energized by the circuit L+6, F1, T, L—6 and it opens its contact members T1 to hold the chain relays H and J in their present deenergized condition.

The relay AW is energized by the starting pick up circuit L+4, AW, QQ3, L—4 and it closes its contacts AW4, for its self-holding circuit; its contacts AW2 for energizing the auxiliary starting relay QQ; its contact members AW5 to prepare a pick up circuit for "next" relay BW. The circuit for the energized relay QQ extends: L+4, 53, AW2, QQ, L—4. The energized relay QQ closes its self-holding contacts QQ1, closes its contacts QQ2 to prepare a circuit for the chain relays H and J, and opens its contacts QQ3 to render inactive the starting pick up circuit through relay AW.

The energized relay AW also closes its contacts AW1 thus energizing the up direction relay FU (Fig. 3) by the circuit L+1, 82, FD1, FU, L—1. The energized relay FU closes its contacts FU1 to FU6 to start the scheduling selector ADP in up direction operation.

The dispatching system is also now ready for operation and it will be assumed that the attendant in car A closes his switch 56, thus energizing his "car-in-service" relay AY by the circuit:

L+5, 56, AY, 55, L—5.

The energized relay AY closes its contacts AY1, AY2, AY3, AY4 and AY5. The closing of the contacts AY1 prepares the circuit of the "start" relay AX of car A. The closing of the contacts AY3 in the circuit of the finder relay F has no effect because the contacts AW7 in that circuit are open. However, the closing of the contacts AY2 lights the "next" lamp 58 in car A to notify the attendant that his car will be next to receive the dispatching signal and also lights the floor lantern 57 for car A at the first floor to indicate to waiting passengers that car A will be next to leave. The circuit for the next lamp 58 extends:

L+5, AY2, AX2, AW6, 58, L—5.

The circuit for the first floor lantern 57 extends:

L+5, AY5, AW9, 57, L—5.

It will be assumed now that the attendants on the cars B and C close their switches B56 and C56 thereby energizing their "car-in-service" relays BY and CY. Thereupon relay BY closes its contacts BY3, thus energizing the car finder relay F which opens its contact members F1 in one circuit to the relay T. However, relay T remains energized because it has the closed circuit:

L+6, AX4, AW8, AY4, T, L—6.

Hence, the timing chain will not start timing for the "next" car while car A remains at the dispatching floor after having been designated as the "next" car.

When the starting relay Q was energized to close its contact members Q1, it also connected the circuit of the impulse device for operation, and it will be assumed that the impulser motor 40 is operating at its predetermined constant speed and now advances the brush 41 into engagement with the contact segment $j$—1. This engagement energizes the impulse relay V (Fig. 6) by the circuit L+4, 52, 41, $j$—1, V, L—4. The energized relay V closes its contact members V1, thereby energizing the "start" relay AX by the circuit L+5, AX, AY1, AW3, V1, L—5.

The energized relay AX closes its self-holding contacts AX1, opens its contact members AX2 to extinguish the "next" lamp 58 for car A, and closes its contact members AX3 to energize the "start" lamp 59 for car A by the circuit L+5, AY2, AX3, 59, L—5. Thus the action of the impulser caused the lighting of the "start" lamp for car A to indicate to the attendant that he should leave on his trip.

Energized relay AX also opens its contact members AX4, thus deenergizing the timing relay T to start the driving relays J and H, and the chain relays BW, etc., in operation to find the next car to receive the "next" signal.

As timing relay T drops out after one fourth second, it closes T1 to energize relay H, by the circuit (L+4, J3, QQ2, T1, J2, H, r55, L—4) which, in turn, energizes relay T (by the circuit L+6, H6, J1, T, L—6), and relay J (by the circuit L+4, J, H1, H, r55, L—4), and at the same time completes the circuit for energizing the "next" relay BW for car B by the circuit L+4, BW, AW5, H3, L—4. The energized relay J opens its contact members J5, thus deenergizing the "next" relay AW for car A and restores it to its inactive condition. The deenergized relay AW opens its contacts AW9 thus extinguishing the first floor lantern 57 for car A.

As car A leaves the first floor, it opens its switch 55, thus deenergizing the "car-in-service" relay AY which, in turn, deenergizes the "start" relay AX for car A and extinguishes the start lamp 59 for car A by opening its contact members AY1 and AY2.

Returning now to the energized "next" relay BW for car B, we find that it closes its contacts BW7, thus lighting the first floor lantern B57 for car B to indicate to the waiting passengers that car B will now be the next car to leave; closes its contacts BW4 for lighting the "next" lamp B58 for car B; closes its contacts BW1 for energizing the up direction relay BFU (Fig. 4) to start the desired-position selector for car B in up direction operation; and closes its contacts BW3 to prepare a pick up circuit for the "next" relay CW for car C.

Car B now has the signal to be the next car to leave and it will be assumed that the impulser 37 has by this time moved the brush 41 into engagement with the contact segment $j-2$, thereby again temporarily energizing the impulse relay V to close its contact members V2 for energizing the "start" relay BX for car B. The energized relay BX opens its back contacts BX2 to extinguish the next lamp in car B and closes its contact members BX3, thereby energizing the "start" lamp B59 for car B to indicate to the attendant on the car that he should leave the dispatching floor. The energized relay BX also opens its contact members BX4, thus deenergizing the timing relay T which starts to drop out for the purpose of operating the driving relays J and H to find the next car. As the deenergized relay T opens, it closes its contact members T1, thereby deenergizing the relay H which closes its contact members H1, thus reenergizing the relay T, but leaving relay J energized. The deenergized relay H closes its contact members H2, thus energizing the "next" relay CW for car C by the circuit L+4, CW, BW3, H2, L—4. The energized relay CW opens its contact members CW4, thus deenergizing the car finder relay F which closes its contact members F1 in the circuit for the relay T but that relay is already energized.

The energized relay CW closes its contact members CW7 for energizing its first floor lantern C57, closes its contact members CW4 (not shown) for energizing the "next" lamp C58 in the car C and closes its contact members CW1 (not shown) for energizing its up direction relay CFU (not shown) to operate the desired-position selector for car C in the up direction.

The energized relay T opens its contact member T1, thereby deenergizing the driving relay J, which, in turn, opens its contacts J6 and thus deenergizes the relay BW.

Assuming now that car B leaves the dispatching floor, thus opening its limit switch B55 and thereby deenergizing the "car-in-service" relay BY, which, in turn, opens its contact members BY1 and BY2 for deenergizing the "start" relay BX and the "start" lamp B59 for car B.

In the meantime, the impulser 37 continues the movement of its arm 38 until the brush 41 engages the contact segment $j-3$, thereby temporarily energizing the impulse relay V. The relay V closes its contact members V1, thus energizing the "start" relay CX by the circuit L+5, CX, CY1, CW1, V1, L—5. The energized relay CX opens its contact members CX2 (not shown) in the circuit of its "next" lamp C58 and thereby extinguishes that lamp. At the same time, relay CX closes its contact members CX3 (not shown) in the circuit of its "start" lamp C59, thereby lighting that lamp to give car C a start signal from the dispatching floor.

It will be assumed now that car C leaves the dispatching floor and in so doing, opens its switch C55, thereby deenergizing its relay CY (not shown) which opens its contacts CY1 to deenergize the "start" relay CX for car C, opens its contacts CY2 (not shown) for extinguishing the "start" lamp C59 in car C and opens its contacts CY5 to extinguish the floor lantern C57 for car C.

It will be assumed now that car A completes its round trip and arrives at the first floor, thus closing its lower limit switch 55 and thereby again energizing the terminal relay AY. It is also assumed that the desired-position selector of the car has also arrived at the lower floor and operated its lower limit switch 83 which opens the circuit for down direction relay FD and thus deenergizes that relay to stop the motor 28 of the desired-position selector and prevent it from operating until car A is again given a "next" signal. From this it will be seen that the desired-position motor and selector are tied in with the dispatching system so that the desired-position selector is started only when the car with which it is associated is given a "next" signal.

Returning now to the energized terminal relay AY, its closed contacts AY3 cause the car finder relay F to be again energized, and the relay F in turn opens its contacts F1 (Fig. 7) to deenergize the timing relay T and start the chain driving relays J and H into operation to select the next car to receive the next signal. It may be observed here that the timing relay T is energized whenever no car is at the dispatching floor.

After the expiration of its predetermined delay period, the deenergized relay T opens, thus closing its contact members T1 to energize the driving relay H, which in turn energizes the relay T by the circuit previously described. The relay H closes its contact members H3, thus energizing the "next" relay DW for car D but car D is not in service. However, the energized relay DW closes its contact members DW2 and provides a holding circuit for itself and also closes its contact members DW1 in the circuit of the relay AW so that that relay may be picked up by the driving relays in finding the car ready to receive the next signal. Returning now to the energized relay T, it opens its contact members which causes the relay J to be energized along with the relay H. The energized relay J opens its contact members J5, thus deenergizing the next relay CW for car C. Relay J also opens its contact members J7, thus deenergizing the timing relay T (Fig. 7). After its predetermined delay, relay T drops out and closes its contact members T1 (Fig. 6) thus deenergizing the relay H because it shorts out that relay. The deenergized relay H closes its contact members H7, thus again energizing the timing relay T, which, in turn, deenergizes the relay J which opens its contact members J6, thus deenergizing the relay DW for car D.

Returning now to the deenergized relay H, we find that it closed its back contacts H2 before the relay DW opened its contacts DW1 and thereby energized the next relay AW for car A by the circuit L+4, AW, DW1, H2, L—4. The energized relay AW opens its contact members AW7, thereby deenergizing the car finding relay F because car A is now at the dispatching floor and has received the next signal.

The deenergizing relay F closes its contacts F—1 to keep the timing relay energized until it is necessary to have another operation of the relays J, H, and T to find another "next" car.

The energized relay AW also closes its contacts AW6 thus lighting the "next" lamp 58 for car A; closes its contacts AW9 for lighting the floor lantern 57 for car A at the first floor; and closes its contacts AW1 for again energizing the up-direction relay FU to start the motor 28 of the desired-position selector to operate that selector for an up trip.

From the foregoing description, it will be seen that the dispatching system will operate "next" signal lamps and "start" signal lamps for the cars to indicate when they will be next to leave and when they should leave the dispatching floor and will also start the desired position selector for any car into operation when that car is given its "next" signal to warn the attendant that his car will be next to receive the "start" signal at the dispatching floor.

It will also be apparent that the dispatching system will effect dispatching of the cars in a non-rotational order instead of in a rotational order, because the first car to arrive at the dispatching floor will close its "car-in-service" switch 55 and thus have its "next" relay (for example relay AW of car A) operated to give it the "next" signal.

*Operation of the "ahead of time," "on time" and "behind time" relays and apparatus*

It will be assumed that the cars A, B and C are at the first floor in condition for operation and that the dispatching system has operated the "next" relay AW for car A, as described previously. In explaining the operation of the scheduling system, car A will be operated from its position at the lower floor to the upper floor and then returned to the lower floor.

It will also be assumed that the up and down brushes on the actual position selector of car A are controlled by the up running contacts EU1 of an up running relay (not shown) and by the down running contacts ED1 of a down running relay (not shown) in the control circuit of car A, and that the contacts EU are closed.

Assuming that the "next" relay AW has just been energized and that it has just energized up direction relay FU to start the motor 28 to move the cross arm 26 of the desired-position selector ADP upwardly according to its normal speed of operation, then as the motor starts, the brush 31 on the arm 26 of the desired-position selector ADP will be on the contact segment $a_1$ and, at the same time, the brush 22 on the arm 24 of the actual-position selector AP1 will be on the contact segment $b_1$, thereby completing a circuit for energizing the "car-on-time" relay M:

L+1, M, FU4, 31, $a_1$, $b_1$, 22, EU1, L—1

The energized relay M closes its contact members M1 and M2 thereby energizing the ahead-timing relay KT and the auxiliary relay N for the car-ahead relay K and also the behind-timing relay LT and the auxiliary relay P for the car-behind relay L.

As long as the car-on-time relay is energized and no calls are registered and no other car is in operation, no change is made in the system because the car is theoretically operating on schedule and with the desired schedule set by the desired-position selector ADP.

It should be noted, however, that the desired-position selector ADP has already started to leave its position corresponding to the first floor because it was started when car A received its "next" signal (relay AW energized motor 28), and that it will probably pull sufficiently far ahead of the actual selector of car A to cause the advance relay K to be deenergized. It will also be assumed that the impulser 37 has moved its brush 41 to the contact segment $j$—1, thereby temporarily energizing the impulse relay V which closes its contact members V1 to energize the "start" relay AX as before described. The energized relay AX extinguishes the "next" lamp 58 for car A and lights the "start" lamp 59 for car A to indicate to the attendant on that car that he should move the car from the dispatching floor.

At this point, it will be assumed that the desired-position selector has moved its brush arm B26 from the first floor contact segment to the second floor contact segment. This action deenergizes the car-on-time relay M by moving the brush 31 from the contact segment $a_1$ and energizes the car-behind-time relay L by moving the brush 32 into engagement with the contact segment $a_1$ by the circuit:

L+1, L, FU5, 32, $a_1$, $b_1$, 22, EU1, L—1

The energized relay L opens its contact members L1, thereby deenergizing the holding relay P and the car-behind timing relay LT. After a predetermined time interval (assumed as five seconds) the relay LT opens and the car A still at the first floor becomes a "behind-time" car, and the motor 86 (Fig. 5) starts lowering the voltage of the up generator 47 which in turn decreases the speed of the desired-position selector motor 28 and the impulser motor 40 to cause them to operate more slowly. Inasmuch as only one car is behind time, this decrease in speed is accomplished very slowly.

The decrease in speed is effected as follows: The deenergized relay LT closes its back contacts LT1 (Fig. 5) thereby shorting the resistor Ar30 in the circuit of the field winding 86F— of the rheostat motor 86, thereby increasing the strength of that field winding so that it now over-balances the generator field winding 86F+. This causes the armature 86A of the motor 86 to move the rheostat arm 87 to the left, thus increasing the amount of resistance in the circuits of the field windings 47UF of the up-direction generator 47, and the field winding 48DF of the down generator 48. The decreased voltage of the generator lowers the voltage supplied to the desired-position selector motor 28, and also the motor 40 of the impulser 37. Hence the desired-position selector ADP and the dispatching impulser 37 will travel at slower speed while car A is behind time, and the desired-position selector and the impulser keep moving slower and slower as long as relay LT is in its deenergized condition.

It will be assumed now that 15 seconds have elapsed since car A was given its "next" signal and that it has started on its up trip in response to the lighting of its starting lamp 59. Inasmuch as the car normally travels faster than its desired-position selector in order to give it time to make a reasonable number of stops and yet keep up with its schedule, and inasmuch as no stop calls have as yet been registered, the car will overtake the desired-position selector. Let us assume that, at a point corresponding to the position at the sixth floor, the car overtakes the desired-position selector so that the on-time brush 31 engages the contact segment $a6$ and the brush 22 engages the contact segment $b6$. Hence, the behind-time brush 32 is not now on the segment connected to the segment engaged by the actual-position brush 22, the circuit for the behind relay L is broken and that relay is deenergized. At the same time the on-time brush 31 and the actual position brush 22 complete the circuit for energizing the on-time relay M which closes its contact members M1 and M2 to renergize the behind timing relay LT and the auxiliary relay P and to also maintain the ahead timing relay KT in its energized condition.

The energized relay LT opens its contact members LT1, thus inserting the resistor $ar30$ in the circuit of the field winding 85F—, thereby balancing that field winding with the field winding 86F+ and causing the rheostat motor 86 to cease operating so that the rheostat arm 87 stays in the position on the resistors 47r50 and 48r40 to which it moved while car A was behind-time.

Inasmuch as the car A and its actual-position selector travel faster than the desired-position selector, it will be assumed that the car selector moves ahead of the desired-position selector at the tenth floor. This causes the on-time brush 31 to get out of electrical connection with the actual brush 22 thus deenergizing the relay M. It also causes the ahead brush 30 to engage the contact segment $a10$, electrically connected to the contact segment $b10$ engaged by the brush 22, thereby completing a circuit for energizing the car ahead relay K, which circuit follows: L+1, K, FU3, 30, $a10$, $b10$, 22, EU1, L—1 (Fig. 3) The energization of relay M opens its contact members M1 and M2 thus leaving the behind relay LT energized because of its holding relay P and the back contacts of deenergized relay L, but at the same time deenergizing the ahead timing relay KT because the back contacts K1 of relay K are now open.

At the end of the timing period, say 5 seconds, for relay KT, it drops out; thus its contacts KT1 (Fig. 5) close in the circuit for the field winding 86F+ and short the resistor $Ar20$ in series with that winding, thus increasing the strength of the winding. The winding 86F+ now over-balances the field winding 86F— and causes the armature $85a$ to rotate the rheostat arm 87 to the right, thereby decreasing the amount of the resistors 47r50 and 48r50 in the circuits of the generator field windings 47UF and 48DF. This strengthens the field windings and causes the generators 47 and 48 to increase the delivery of voltage to the desired-position selector motor 28 and the impulser motor 40, thereby increasing the speed of the desired-position selector and the impulser for giving the timing impulses for dispatching the cars.

It will be assumed now that as car A approaches closely to its upper terminal, its desired-position selector also approaches closely to its upper terminal position. Inasmuch as the car and its desired-position selector are both near the upper terminal position at the same instant, on-time brush 31 and the actual brush 22 are electrically connected thus again energizing the on-time relay M and deenergizing the ahead relay K. The energization of the relay M causes the relays KT and LT to be energized, thus opening their contact members KT1 and LT1 (Fig. 5) thereby inserting the resistors $Ar20$ in circuit with the rheostat field winding 86F+ and the resistor $Ar30$ in the winding 86F—. The rheostat field windings are now equal in strength and the rheostat motor 86 which had been slowly decreasing the amount of resistance in the generator field windings 47UF and 48DF is stopped and the generators maintain the voltage at the increased rate.

It will be assumed now that car A arrives at the upper terminal and that its desired-position selector also reaches its upper terminal position.

When car A arrives at its upper terminal its control system opens the up running contacts EU1 to disconnect brush 22 and closes its down running contacts ED1 to energize the down brush 25 on the actual position selector for down operation.

As the desired-position selector ADP moves to its upper terminal position, it opens its top limit switch 82 (Fig. 3) thereby deenergizing its up-direction relay FU. The deenergized relay FU opens its holding contacts FU1; closes its back contact FU2 to energize the down direction relay FD, opens its front contact members FU3, FU4, and FU5 to electrically disconnect up brushes 30, 31 and 32 from the circuits leading to the relays K, M and L, thus deenergizing them, and also opens its contact members FU6 to change the direction of operation of the desired-position selector motor 28.

The circuit for relay FD is L+1, 83, FU2, FD and L—1. The energized relay FD opens its contact members FD1 to prevent the energization of the up-direction relay FU while car A is moving down: closes its contact members FD2, FD3 and FD4 to electrically connect the down advance brush 35, the down on-time brush 34 and the behind brush 33 to the relays K, M and L; and the closing of the contact members FD5 connects the armature 28A of the desired-position selector motor 28 in circuit with the armature 48DA of the down direction generator 48, so that the motor 28 reverses and immediately starts arm 26 on its down movement.

The connection of the down brushes 35, 34 and 33 to the relays causes the relay M to be reenergized because the car and its desired-position selector are both now at their upper terminal position and conditioned for down operation, and, under these condition, the down on-time brush 34 is on segment $C12$ and the down brush 25 is on segment $d12$, thereby completing the circuit L+1, M, 34, c12, d12, 25, EDI, L—1 for relay M (Fig. 3). The relay M closes its contacts M1 and M2, thus again energizing the relays KT, N, LT and P, thereby completing the reversal operation at the upper terminal.

It will be assumed now that the car hesitates a short time at the upper terminal and starts on its down trip about 10 or 15 seconds after the departure of the scheduling-selector. Under these conditions, the scheduling-selector will move ahead of the car selector so that, say at the 10th floor, the ahead brush 35 will engage the contact segment c10 and the actual brush 25 will engage the contact segment d10 thus completing a circuit for the behind relay L and deenergizing the on-time relay M, thereby causing the behind timing relay LT, to be deenergized. After its delay period of, say 5 seconds, relay LT opens thereby closing its back contact members LT1 and thus shorts the resistor Ar30 in the circuit of the field winding 86F—. The winding 86— now over-balances the field 86F+ and causes the motor 86 to move the rheostat arm 87 to the left thus increasing the amount of the resistors 47r50 and 48r40 in the field windings 47UF and 48DF of the up and down generators, thereby decreasing their voltage and causing the motor 28 of the desired-position selector and the motor 49 of the impulser to gradually decrease their speed, thus slowing down the system to cause it to operate the desired-position selector and the dispatching impulser more in accordance with the ability of the car A to run on its pattern schedule.

It will be assumed now that car A continues its run to the lower terminal and that in doing so, it catches up with the desired-position selector, say, at the eighth floor, at which time the down "on-time" brush 34 engages the contact segment c8 at the same time that the actual brush 24 engages the contact segment d8, thus completing a circuit for energizing the "on-time" relay M while the brush 33 gets out of electrical connection with the brush 24 and thus deenergizes the car behind relay L. The energization of the relay M closes contact members M1 and M2, thereby reenergizing relay KT and the relay LT (Fig. 3) which thereupon opens their contacts KT1 and LT1 (Fig. 5) and thus reinsert the resistors Ar20 and Ar30 in the rheostat motor field windings 86F+ and 86F—. The field windings 86F+ and 86F— of the rheostat motor now balance each other, thus stopping the armature 86A with the rheostat arm 87 left in the position to which it was moved when car A ran behind its schedule.

It will be asumed now that car A runs on to the first floor terminal, thus closing its switch 55 to energize its "car in service" relay Ay and also moving its actual-position selector into first floor position. At the same time the desired-position selector moves into its first floor position and thereby opens its terminal switch 83, which thereupon deenergizes the down direction relay FD, which, in turn, closes its contact members FD1 to prepare the up direction relay FU for energization. However, the relay FU is not yet energized because the contact members AW1 of the "next" relay for car A are open and will not be closed until car A is selected to receive the "next" dispatching signal. The contact members FD2, FD3 and FD4 open to disconnect the down brushes of the desired-position selector from the relays K, M and L. The deenergized relay FD also opens its contact members FD5 in the circuit of the desired-position selector motor 28, thereby stopping the operation of the desired-position selector.

Both the actual-position selector and the desired-position selector for car A are now idle, but the dispatching impulse motor 49 continues to operate the impulser arm and will continue to do so until it strikes its upper limit switch 84, which will thereupon deenergize the relay GU to open its contact members GU1 and GU2, thus stopping the impulser. However, the deenergization of the relay GU closes its back contact members GU3 thus energizing the down direction relay GD (Fig. 5), which thereupon closes its contact members GD1 and GD2, thus reversing the motor 49 of the impulser and causing it to start the impulser arm in the downward direction for the purpose of giving dispatching impulses at the intervals of time determined by the setting of the rheostat motor 86, and it will continue to operate at that speed until some car gets ahead of or behind its schedule and thus cause it to change its speed.

The foregoing has been descriptive of the action of only one car, namely car A, and its desired-position selector moving element. It is believed to be obvious, however, that a plurality of cars when operated simultaneously, will operate with each car following the motion of its desired-position selector and will set up "on time," "behind time" and "ahead of time" zones for itself. With a plurality of cars operating, each "behind time" car will slow down the speed of desired-position selector motors through the action of the rheostat motor 86. The action will be gradual. Therefore, one car of a bank of elevator cars will, when it is behind time, have only a slight slowing down effect on the desired-position selector of the other cars. However, if all of the cars become behind-time cars, the speed of the rheostat motor 86 will be proportionately increased to move the rheostat arm 87 to the left, thereby giving a much greater slowing down of the desired-position selector motors in a given period of time.

If the round trip time of all the desired-position selectors is lengthened, the round trip time of the impulser motor 49 will also be lengthened. Therefore, the cars will be dispatched from the dispatching floor at longer and longer intervals. Consequently, a number of cars being "behind time" will result in a slower round trip time of all of the desired-position selector motors and in a longer dispatching interval. On the other hand, if the cars consistently run ahead of time, they will cause their ahead of time relays to be operated to effect the operation of the rheostat motor 86 in the opposite direction to decrease the amount of resistance in the field windings of the generators and thus increase their voltage and, consequently, the speed of the desired-position selector motors 28, etc., and the impulser motor 49. This will effect the speeding up of the dispatching means and also the desired-position selectors so that the scheduled round trip time of the cars will be increased and the speed of the impulser will be increased to give the dispatching signals at more frequent intervals thus operating the system as a whole in conformity with the ability of the cars to keep up with their desired-position selectors. Inasmuch as the ability of the cars to keep up with their schedules is determined by the number of calls to be answered by the cars, it is evident that the system will cause the cars to be operated in accordance with the amount of traffic they serve.

*An assumed operation of the shunting relay Z*

A noted above, the desired-position selectors and the impulser will operate normally in accordance with the normal speed for which they are designed, but when some of the cars get behind schedule, the speed will be decreased, and when some of the cars get ahead of their schedule, the speed will be increased. However, this decrease or increase of speed will be gradual, and not sufficiently quick to take care of operations under some conditions, for example, in a case where a large number of down calls are registered at the same time. When a large number of down calls stands registered at one time, it means that the cars will be slowed up considerably in their downward movements by answering the down calls. Therefore, we have provided means for quickly decreasing the speed of the desired-position selectors and the impulser whenever a sudden load of unanswered calls for the down direction is placed upon the system. This means comprises the shunt relay Z (Fig. 7) controlled by resistors operated by the down stop call registering devices.

It will be assumed that down stop calls are registered at the 11th, 10th, 9th, 8th, 7th, 6th floors, while car A is at the upper terminal, car B is at the 6th floor on an up trip and car C is at the 2nd floor on an up trip and that they are all "on-time" cars. Referring to Fig. 5, it will be assumed that the down stop call at the 11th floor is registered by operating the push button 11DP which energizes the relay 11R to close its self-holding contact members 11R1 and, at the same time, closes its contact members 11R3 (Fig. 7) for energizing the relay Z by the circuit:

$$L+6, 11R3, r61, Z, L-6$$

The current passing through this resistor is not sufficient to operate the relay Z, but inasmuch as similar down stop calls are registered at the 10th, 9th, 8th, 7th and 6th floors, the circuits through the resistors $r62$, $r63$, $r64$ and $r65$ will be closed, and they will pass sufficient current to energize the shunting relay Z.

The energized relay Z will thereupon close its contact members Z1 (Fig. 5) to include the resistor 90 in a shunt circuit around the field winding 48DF of the down generator 48. This shunt circuit will cause the voltage of the down generator to decrease and thereby decrease the speed of the driving motor of the desired-position selector ADP of car A (now on its down trip), so that the car A can take care of this rush of registered down calls without upsetting the smooth operation of the system. As the stop calls are answered, the registering relays will be restored to their inoperated condition and will thereby open the contact members 11R3, 10R3, etc., in circuit with the resistors $r61$, etc., leading to the relay Z (Fig. 7) and thereby cause that relay to be deenergized and thus open its contact members Z1. The opening of the contact members Z1 eliminates the shunt circuit including the resistor 90 from around the generator field 48DF so that that field is now strengthened and the down generator 48 increases its voltage and thereby increases the speed of the motor 28 of the desired-position selector ADP for car A, while car A is traveling in the down direction after it has answered a large number, if not all, of the down stop calls registered.

In this operation it will be seen that the system provides for taking care of any unexpected piling up of registered calls for the down direction and, of course, the system may be readily adjusted in the same manner for taking care of a rush in up calls in addition to or without the down calls, if desired.

*An assumed operation of the apparatus for causing the cars to answer stop calls in accordance with whether they are ahead of time, on-time, or behind-time.*

Particularly in connection with Fig. 5, it will be assumed that the cars A, B and C are disposed at the upper terminal and that car A has started on a down trip, ahead of its schedule, and is almost within stopping distance of the 11th floor; when a waiting passenger at the 11th floor presses the down button 11DP to register a down stop call at that floor. The closing of the push button energizes the down call registering relay 11R to close its self-holding contact members 11R1 and its contact members 11R2, and at the same time energizes the electromagnetic clutch coil 67 and the timing motor 11RT (Figs. 2, 3 and 5) for the 11th floor call registering device. The closed contacts 11R2 energize the down contact segments $g11$, $Bg11$, $Cg11$, etc. (Fig. 5), for operating the down stop relay of the next car to approach by the circuit:

$$L+3, 150, 11R2, 11r1, 11r2, g11, Bg11 \text{ and } Cg11, \text{etc.}$$

As indicated in Fig. 2 the energization of the clutch coil 67 causes the clutch plates 64 and 65 to engage thus causing the shaft 66 to be rotated by the energized motor 11RT. At this point the cam wheels 69 and 70 have not yet closed the contact members 11RT1 or 11RT2 hence the resistors 11r1 and 11r2 (Fig. 5) are in the circuit leading to the stopping contact segments $g11$ for the 11th floor.

The resistor 11r1 will not be eliminated for 15 seconds and the resistor 11r2 will not be eliminated for 30 seconds after the timing motor starts.

However, we have observed that car A is on its down trip, is within stopping distance of the 11th floor and is ahead of its schedule, which means that its car ahead relay KT is deenergized (as described in the operation of the schedule comparing relays K, M and L), thereby closing its back contact members KT2 (Fig. 5) in the stopping circuit for relay S of car A, thus shorting the resistors $Ar3$ and $Ar4$ in that circuit. Consequently, as car A arrives at the proper point for picking up the energized segment $g11$ and its down stopping brush 24 engages the down contact segment $g11$ for the 11th floor, it energizes the stopping relay S to stop car A at that floor by the circuit:

$$L+3, 150, 11R2, 11r1, 11r2, g11, 24, S, KT2, 151, L-3$$

The energized relay S will effect the stopping of car A at the 11th floor. Therefore, it is seen that, inasmuch as the 11th floor call was registered for less than 15 seconds and its two resistor section 11r1 and 11r2 were in its circuit, car A picked up the call and stopped at that floor because it was an ahead-of-time car and the resistors AR3 and AR4 in its stopping circuit to the relay S were short-circuited by the closed contact members KT2.

As car A stopped at the 11th floor, it energized the call cancellation coil IIRC thereby restoring the call registering relay IIR to its normal condition and deenergizing the timing motor IIRT and the clutch coil 67 to cause the timing cam wheels to return to their normal position.

Car A now completes its call and leaves for the lower terminal.

Another condition of operation will now be assumed in which a car is an on-time car and the stop call has been registered for more 15 seconds and less than 30 seconds. In assuming this operation, it will be considered that car B is at the upper terminal going down on time and that another waiting passenger at the 11th floor has registered the down stop call on the relay IIR as previously described. The registration of the call on IIR starts the timing motor IIRT to rotating the shaft 66 and the cam wheels thereon. It will be assumed now that 15 seconds elapse before car B arrives within stopping distance of the 11th floor. Therefore the timing motor IIRT has rotated the cam wheel 69 (Figs. 2 and 2C) to the point where it closes the contacts IIRT1 thus shorting the resistor IIr1 in the circuit leading to stopping segments BG11, etc., but cam wheel 70 has not yet closed contacts IIRT2 around resistor IIr2. Inasmuch as car B is on time, its on-time relay BM is energized, thereby energizing relay BLT to close its contact members BLT2 and its ahead timing relay BKT is also energized to open its contacts BKT2 in the circuit to the stopping relay BS, thus shorting out resistor Br4 but leaving resistor Br3 in the circuit. Hence, when the brush B24 of car B engages energized segment Bg11 at a time more than 15 seconds after registration of the call, the stopping circuit for energizing the stopping relay BS to stop the car is completed as follows:

L+3, 159, IIR2, IIRT1, IIr2, Bg11, B24, BS, Br3, BLT2, 151, L—3

The relay BS is energized because only two resistors are in its circuit. The energization of the stopping relay BS stops car B at the 11th floor. And at the same time energizes the cancellation relay IIRC to restore the call registering relay IIR to its normal condition and also restore the timing motor IIRT to its normal position. If the call had not been registered for at least 15 seconds, the resistor IIr1 would have been included with the resistor IIr2, and Br3 in the stopping circuit through the stopping relay BS and the relay would not have operated to stop the car.

Hence, it is seen that an on-time car will not answer a registered call unless that call has been in existence at least 15 seconds, because no car will be stopped when more than two resistors are in its stopping circuit. However, when the car is on time, it cuts out one resistor and when the call has been registered more than 15 seconds, it cuts out another resistor, leaving only two resistors in the circuit, under which conditions the car will stop.

Car B now completes its down stop at the 11th floor and goes on down to the lower terminal.

An operation will now be assumed to show how a car behind time will stop only for a call which has been registered more than 30 seconds, or any car will stop if the car has been registered more than 30 seconds.

It will be assumed that cars A and B are at the lower terminal, that car C has started down from the upper terminal and that a down stop call has been registered on the 11th floor. The energization of the relay IIR again energizes the electromagnetic clutch 67 and the motor IIRT to start operating the cam wheel 69, 70 and 71, corresponding to the 11th floor. During the first 15 seconds after the relay IIR is energized, the motor RT causes the cam 69 to rotate slowly into the position where it closes the contact members IIRT1 at the end of 15 seconds (Fig. 2c), thus shorting the resistor IIr1 in the car stopping circuit leading to the down stopping contact segments g11, Bg11, Cg11. At the end of 30 seconds, the motor IIRT has rotated the cam wheel 70 to the position where it closes the contact members IIRT2, thus short-circuiting the resistor IIr2 in the stopping circuit leading to the down stopping contact segments g11, Bg11 and Cg11. As the motor IIRT rotates the cam wheel 70 into position to close the contact members IIRT2, it rotates the cam wheel 71 into position where it opens the contact members IIRT3, thereby stopping the timing motor IIRT. However, the stopping of this motor does not return the cam wheels to their starting position because the clutch 67 is still energized and will remain energized until the stop call is cancelled.

Assuming now that car C is behind time and approaches the down stop call at the 11th floor which has been registered for more than 30 seconds, under these conditions the resistors IIr1 and IIr2 in the stopping circuit to the segment Cg11 have been short-circuited as described but the resistors Cr3 and Cr4 in the circuit of the stopping relay CS have not been short-circuited because relay CKT is energized and behind timing relay CLT is deenergized. However inasmuch as there are only two resistors in the completed stopping circuit, the stopping relay CS will be energized by the circuit:

L+3, 150, IIR2, IIRT1, IIRT2, Cg11, C24, CS, Cr3, Cr4, L—3

The energization of the stopping relay CS causes the car to stop at the 11th floor whereupon it energizes the cancellation coil IIRC and causes the relay IIR to be deenergized and open its contact members IIR1, thereby deenergizing the electromagnetic clutch 67 which permits the timing cam wheels to return to their starting position under the influence of the spring 72.

It will also be apparent from this assumed operation that, when the resistors IIr1 and IIr2 are short-circuited at the expiration of 30 seconds, any car approaching that registered call will stop because it makes no difference whether its resistors r3 and r4 are in the circuit or out of the circuit because as before stated, if any number of resistors less than three are in the stopping circuit, the car will stop.

From the above description, it will be apparent that we have provided a system which will cause a car ahead of time to stop for any call regardless of how short a time it has been registered; a car on time will stop for a call which has been registered at least 15 seconds or longer; and a car behind time will not stop for any call unless that call has been registered at least 30 seconds. From this it will also be apparent that any call registered more than 30 seconds will be answered by any passing car.

It will also be apparent that the cars will tend to maintain a spaced relationship without interfering with the service being rendered. Thus a car becoming late or behind its proper position will be speeded up by not being required to answer calls registered only a short time. These calls are left for the next car presumably on time and therefore only a few seconds behind the late car. Also a car ahead of time will be slowed down in its travel by having to respond to all calls. Thus a call registered for only a few seconds will cause it to stop, where "on time" or "late" cars would pass by. This delaying of an "ahead of time" car will bring it back to its desired position in its sequence, thus preventing a gap in the spacing of the cars and therefore eliminating one of the chief factors producing long waits and poor service in elevator systems.

In view of these arrangements, it will be apparent that we have provided a system in which the cars will answer registered calls in such manner that the calls will usually be answered within a reasonable time after they have been registered, but neither immediately after they are registered nor a long time after they are registered, thus providing a system which will see that all the calls are answered within a short period on the average, thereby causing nearly every passenger to wait a short interval for service after registering a call but never permitting him to wait for an extended period after registering a call.

It will be further understood that we have provided a system in which the dispatching signals are normally given at predetermined intervals of time but which will, under the influence of cars being ahead of time or behind time be given at such times as are best suited for the operation of the cars and keep them from becoming bunched or otherwise poorly dispatched in the elevator system. It will also be seen that these features have been arranged to so cooperate that the calls will be answered somewhat in accordance with the speed of the cars and the dispatching system.

Although we have illustrated and described only one specific embodiment of our invention, it is to be understood that many changes therein and modifications thereof may be made without departing from the spirit and scope of the invention.

We claim as our invention:

1. In an elevator system for operating a plurality of cars serving a plurality of floors, the combination of a scheduling selector for each car, connected for operation at a predetermined speed independently of the car, a dispatching means for giving dispatching signals to the cars at predetermined intervals of time, a stop call registering device for each floor common to all the cars for causing the cars to stop to take on passengers, a timing means connected to each call registering device and operated thereby, a stopping means individual to each car for cooperation with operated call registering devices for stopping the car, means responsive to the relative positions of the cars and their scheduling selectors for controlling the predetermined speeds of the scheduling selectors and the dispatching means approximately in accordance with the ability of the cars to answer the operated call registering devices, and means responsive to the relative positions of the cars with their scheduling selectors and to operation of the timing devices for controlling the effectiveness of the stopping devices to respond to operated call registering devices in accordance with the ability of the cars to keep up with their scheduling devices.

2. In an elevator system for operating a plurality of cars serving a plurality of floors, the combination of a positive selector for each car operated in accordance with that car, a scheduling selector for each car, individual means for operating each scheduling selector at a desired predetermined speed, a comparing means for each car connected to be operated by the relative positions of the positive selector and the scheduling selector of that car, a dispatching means for giving dispatching signals to the cars at predetermined intervals, a signal storing device for each floor common to all the cars, a timing means associated with each signal storing device and operated thereby, a stopping means associated with each car for cooperation with operated signal storing devices for stopping that car, means responsive to operation of the comparing devices for controlling the predetermined speeds of the scheduling selectors and the dispatching means approximately in accordance with the number of stop calls stored, and means responsive to the operation of the comparing means and the operation of the timing means for controlling the effectiveness of the stopping devices of the cars to answer stored stop calls in accordance with the ability of the cars to keep up with their scheduling devices.

3. In an elevator control system for a car operable past a plurality of floors, a switch at each floor for registering calls for service, means associated with each switch for storing the call, means responsive to a call being stored for causing the car to stop at the associated floor, an independent moving member, and means responsive to the relative position of the elevator with respect to said moving member for causing said car to stop for calls of more than one duration of time and for preventing it from stopping for calls of more than another duration of time.

4. In an elevator control system for a car operable past a plurality of floors a switch at each floor for registering calls for service means associated with each switch for storing the call, means responsive to a call being stored for causing the car to stop at the associated floor, an independent moving member, and means responsive to the relative position of the elevator with respect to said moving member for causing the car to stop for only calls stored for more than a predetermined length of time.

5. In an elevator system for a car operable past a plurality of floors, the combination; means to register calls for service disposed to stop said elevator at associated floors, car stopping means responsive to said first-named means for stopping said car at any of the floors, a scheduling mechanism movable independent of said car movements, and means responsive to car position cooperating therewith, means responsive to said car position means being in a predetermined position with respect to said scheduling mechanism for causing said car to pass some of said calls, and further means responsive to said car position means being in a different predetermined position with respect to said scheduling mechanism for causing said car to pass calls registered for a predetermined length of time.

6. In a controlling system for an elevator car operable past a plurality of floors responsive to registered calls for service at said floors for causing said car to stop at the associated floors, the combination; a scheduling mechanism operable over a predetermined path independent of the position or movements of said car, a second mechanism cooperating therewith responsive to car movements for causing it to move over a similar predetermined path, means responsive to one relative position of said scheduling mechanism and said second mechanism for causing said car to pass registered calls of a predetermined duration, and responsive to a second relative position under the same conditions otherwise for causing said car to respond to registered calls of a duration different from said predetermined duration.

7. In an elevator system for operating a plurality of cars serving a plurality of floors the combination of a plurality of actual floor selectors, one for each car, each selector being connected for operation by the car it serves in accordance with the actual position of that car, a plurality of desired-position selectors, one for each car, a motor for operating each selector at a predetermined speed to indicate the desired position of the car with which it is associated, comparing means for each car operated by the relative positions of the actual selector and the desired-position selector for that car to indicate whether that car is ahead of its schedule, on-time, or behind its schedule, a dispatcher for giving starting signals to the cars, an up generator and a down generator for providing electrical energy to the motors and the dispatching means, manually adjustable means for independently varying the speed of the up generator and the down generator for the purpose of varying the predetermined up direction speed of desired-position selectors operating in the up direction and for varying the predetermined speed of the desired-position selectors operating in the down direction, a plurality of stop call registering devices, one for each floor, said registering devices being common to all the cars, a timing device for each car registering device, a stopping means for each car disposed to cooperate with the stop call registering devices when they are in operative condition for stopping the corresponding car at the floor of the operated stop call registering device, means responsive to the operation of the comparing device of a car for modifying the action of the generators to modify the predetermined speed of the active position selectors to cause them to run slower when the cars get behind schedule and to run faster when the cars get ahead of their schedules and for operating the dispatcher to give starting signals at longer intervals when the cars get behind their schedules and at shorter intervals when the cars get ahead of their schedules and means responsive to the operation of the comparing means and the timing means associated with the call registering devices for causing a car when approaching a floor for which a call registering device has been operated to answer the call at once if the car is ahead of time to prevent it from answering the call unless the call has been registered for at least a predetermined period when the car is on time and to prevent it from answering the call unless it has been registered for at least a longer predetermined time than said first predetermined time.

8. In an elevator system for operating a plurality of cars serving a plurality of floors, the combination of a plurality of actual floor selectors, one for each car, each selector being connected for operation by the car it serves in accordance with the actual position of that car, a plurality of desired-position selectors, one for each car, a motor for operating each desired-position selector at a predetermined speed to indicate the desired position of the car with which it is associated, comparing means for each car operated by the relative positions of the actual selector and the desired-position selector for that car to indicate whether that car is ahead of its schedule, on-time, or behind its schedule, a dispatcher for giving starting signals to the cars, an up generator and a down generator for providing electrical energy to the motors and the dispatching means, manually adjustable means for independently varying the speed of the up generator and the down generator for the purpose of varying the predetermined up direction speed of desired-position selectors operating in the up direction and for varying the predetermined speed of the desired-position selectors operating in the down direction; a plurality of stop call registering devices, one for each floor, said registering devices being common to all the cars, a timing device for each car registering device, a stopping means for each car disposed to cooperate with the stop call registering devices when they are in operative condition for stopping the corresponding car at the floor of the operated stop call registering device, means responsive to the operation of the comparing device of a car for modifying the action of the generators to modify the predetermined speed of the active position selectors to cause them to run slower when the cars get behind their schedules and to run faster when the cars get ahead of their schedules and for operating the dispatcher to give starting signals at longer intervals when the cars get behind their schedules and at shorter intervals when the cars get ahead of their schedules, means responsive to a predetermined number of call registering devices being in operated condition simultaneously for modifying the action of the generators to cause them to promptly slow the desired-position selectors for the direction of the registered calls, and means responsive to the operation of the comparing means and the timing means associated with the call registering devices for causing a car, when approaching a floor for which a call registering device has been operated, to answer the call at once if the car is ahead of time, to prevent it from answering the call unless the call has been registered for at least a predetermined time when the car is on time, and to prevent it from answering the call unless it has been registered for at least a longer predetermined time than said first predetermined time.

9. In an elevator system for a car serving a floor, a stopping means for the car, a stop call registering means for the floor, means responsive to operation of the call registering means and to the approach of the car to within stopping distance of the floor to operate the stopping means to stop the car at that floor, and a timing means associated with the call registering means and responsive to operation thereof for preventing it from being effective to cause operation of the stopping means of the car, when it is on time, until after the expiration of a predetermined time after operation of the call registering means.

10. In an elevator system for operating a plurality of cars serving a plurality of floors, the combination of a stopping means individual to each car, a plurality of stop call registering devices, one for each floor common to all the cars, means responsive to an operated call registering device for effecting operation of the stopping means of the nearest approaching car upon its approach to within stopping distance of that floor to stop it at that floor, and a timing means associated with each call registering device and responsive to operation thereof for preventing it from being effective to cause operation of the stopping means of any on-time car until after the expiration of a predetermined time after the operation of that call registering means.

11. In an elevator system for operating a plurality of cars serving a plurality of floors a desired-position means individual to each car for determining whether that car is ahead of time, on time, or behind time, a stopping means individual to each car, a stop call registering device common to all the cars and individual to each floor, means responsive to an operated call registering device for effecting operation of the stopping means of the nearest approaching car upon its approach to within stopping distance of that floor to stop it at that floor, a timing means associated with each call registering device, each timing means being connected to start in operation when its call registering device is operated, and means responsive to the operated timing means of an operated call registering device and to operation of the desired-position means of the nearest approaching car to the floor of the operated timing means for enabling the stopping means of that car to be operated immediately when the car is ahead of time, to prevent operation of the stopping means of that car for a predetermined time when the car is on time, and to prevent operation of said stopping means for a longer predetermined time after operation of said operated call registering device when the car is behind time.

12. In an elevator system for operating a car past a floor, the combination of a stopping device for the car, a call registering means for the floor, a circuit for the floor having a portion connected to the call registering device, a predetermined amount of resistance in said circuit, means operable corresponding to the position of said car for completing said circuit when said car is within a predetermined distance in advance of the floor when the call registering device is operated to effect operation of the stopping device of the car, a timing device connected for operation by operation of the call registering device, and means responsive to operation of the timing device for controlling the resistance in the circuit to the call registering device to prevent operation of the stopping device of the car, when it is on time, for a predetermined time after operation of the call registering means.

13. In an elevator system for operating a plurality of cars serving a plurality of floors, the combination of a car stopping device individual to each car, a call registering means for each floor for registering stop calls for that floor, each call registering means being common to all the cars, a circuit for each floor having a portion connected to the call registering means for that floor and a plurality of branches one for each car, a predetermined amount of resistance in each portion circuit, means individual to each car and operable corresponding to the position of said car for completing the branch circuit for that car of an operated call registering means when said car is within a predetermined distance in advance of the floor of that operated call registering device to effect operation of the stopping device of that car, a timing device for each call registering means connected to be started in operation by operation of the call registering means, and means responsive to operation of the timing device of an operated call registering device for controlling the resistance in the portion circuit of that call registering device to prevent that call registering device from being effective to operate the stopping device of an on-time car for a predetermined time after operation of that operated call registering means.

14. In an elevator system for operating a car past a floor, the combination of a stopping device for the car, a circuit for the stopping device, a predetermined amount of resistance in the circuit of the stopping device, a call registering means for the floor for registering stop calls for the floor, means operable corresponding to the position of the car for causing the call registering means when operated to effect operation of the car stopping device when the car is within a predetermined distance in advance of the floor, a desired-position means for determining whether the car is on time, and means responsive to operation of the desired-position means for controlling said resistance to enable the car stopping means to respond to the operated call registering means immediately when the car is ahead of time.

15. In an elevator system for operating a car past a floor, the combination of a stopping device for the car, a circuit connected to the stopping device, a predetermined amount of resistance in said circuit, a call registering means for the floor for registering stop calls for the floor, a second circuit connected to the call registering means, a predetermined amount of resistance in said circuit, means operable corresponding to the position of the car for completing the first circuit and the second circuit when said car is within a predetermined stopping distance in advance of the floor for causing operation of the stopping means to stop the car when the call registering means is operated, a timing device for the call registering means connected to be started in operation by operation of the call registering means, a desired-position means for determining whether the car is ahead of time, on time, or behind time, and means responsive to operation of the timing means and the desired-position means for controlling the resistance in the first circuit and in the second circuit to enable the operated call registering means to operate the car stopping device immediately when the car arrives ahead of its schedule at the stopping distance, to prevent the stopping device from being operated by the operated call registering device until after the expiration of at least a predetermined time when the car arrives on time at the stopping distance, and for preventing operation of the stopping device until after the expiration of a longer predetermined time when the car arrives behind time at the stopping distance.

16. In an elevator system for operating a plurality of cars serving a plurality of floors, the combination of a stopping device individual to each car, a circuit for each stopping device, a predetermined amount of resistance in the circuit for each stopping device, a call registering means for each floor common to all the cars for registering stop calls for that floor, a circuit for each floor having a portion connected to the call registering means for that floor and a plurality of branches one for each car, a predetermined amount of resistance in each portion circuit, means individual to each car and operable corresponding to the position of said car for completing the branch circuit for that car of an operated call registering means when said car is within a predetermined stopping distance in advance of the floor of that operated call registering device to effect operation of the stopping device of that car, a timing device for each call registering means connected to be started in operation by operation of that call registering means, a desired-position means individual to each car for determining whether that car is ahead of time, on time, or behind time, means responsive to operation of the timing device of an operated call registering means and to operation of the desired-position means of a car approaching within stopping distance of the floor of that operated call registering means to control the resistance in the portion circuit of that operated call registering means and the resistance in the circuit of the stopping means of said approaching car to cause that stopping means to operate immediately if the car is ahead of time, to prevent its operation until after a predetermined time after the operation of the call registering means when the car is on time, and to prevent its operation for a longer predetermined time after the operation of said call registering means when the car is behind time.

17. In an elevator system for operating a car serving a plurality of floors, an actual position selector disposed to be operated by the car in accordance with the actual position of the car, a desired-position selector, means for operating the desired-position selector to indicate the desired position of the car, a comparing means responsive to the relative positions of the actual selector and the desired-position selector for indicating the car as an ahead-of-time car, an on-time car, or a behind-time car, a plurality of stop call registering devices, one for each floor, a stopping means for the car disposed to be responsive to operation of the call registering devices and to the position of the car for stopping the car at the floors corresponding thereto, and means responsive to an ahead-of-time operation of the comparing means for enabling the stopping means to respond promptly to any operated call registering device it approaches for stopping the car, and responsive to an on-time operation of the comparing means for preventing operation of the stopping means in response to an operated call registering device until that device has been in operated condition for a predetermined period, and responsive to a behind-time operation of the comparing means for preventing operation of the stopping means in response to an operated call registering device until after the expiration of a longer predetermined time than when the car is on time.

18. In an elevator system for operating a car serving a plurality of floors, a plurality of call registering devices, one for each floor, a timing device for each call registering device, a stopping means associated with the car and disposed to respond to the operated condition of a call registering device when the car approaches the floor corresponding to said operated call registering device for stopping the car at that floor, and means responsive to operation of the timing device of an operated call registering device for preventing operation of the stopping device when the car is on time until after the expiration of at least a predetermined time after said operated call registering device has been operated, and for preventing operation of the stopping means for a longer predetermined time after said operated call registering device has been operated when the car is behind time.

19. In an elevator system for operating a car serving a plurality of floors, an actual position selector connected for operation by the car in accordance with the actual position of the car, a desired-position selector, means for operating the desired-position selector to indicate the desired position of the car, means responsive to operation of the actual position selector and the desired-position selector for indicating when the car is ahead of time or behind time, and means for delaying operation of the indicating means for a predetermined time after the car moves ahead of or falls behind its desired-position selector.

20. In an elevator system for operating a car serving a plurality of floors, an actual position selector connected for operation by the car in accordance with the actual position of the car, a desired-position selector, means for operating the desired-position selector to indicate the desired-position of the car, an ahead-of-time means responsive to operation of the actual position selector and the desired-position selector for indicating when the car is ahead of its desired-position selector, means for delaying operation of the indicating ahead-of-time means for a predetermined period when the car moves ahead, an on-time means responsive to the actual position selector and the desired-position selector for indicating when the car is on time, a behind-time means responsive to operation of the actual selector and the desired-position selector for indicating when the car is behind time, and means for delaying the operation of the behind-time indicator for a predetermined period of time when the car falls behind the desired-position selector.

21. In an elevator system for operating a plurality of cars serving a plurality of floors, the combination of a plurality of desired-position selectors, one for each car, means for operating the desired-position selector for each car at a predetermined speed on an "up" trip and at a predetermined speed on its "down" trip to indicate the desired position of the car, and an adjustable setting means for automatically varying the speed of the operating means to independently vary the predetermined "up" trip speed of the selectors for the up cars and the predetermined down trip speed of the desired-position selectors for the down cars.

22. In an elevator system for operating a plurality of cars serving a plurality of floors, the combination of a plurality of desired-position selectors, one for each car, means for operating the desired-position selector of each car at a predetermined speed on its "up" trip and on its "down" trip, a plurality of actual position selectors, one for each car, each actual selector being connected to the car it serves for operation in accordance with the actual position of the car, and means responsive to the comparative position of the actual selector of the car and the desired-position selector of the car for modifying the speed of the operating means for all of the desired-position selectors.

23. In an elevator system for operating a plurality of cars serving a plurality of floors, the combination of a plurality of desired-position selectors, one for each car, means for operating the selectors at predetermined speeds, a plurality of actual position selectors, one for each car connected for operation in accordance with the actual position of that car, a dispatcher for giving dispatching signals to the cars at predetermined intervals, and means responsive to the comparative operation of the actual selectors and the desired-position selectors for modifying the speed of the operating means for the desired-position selectors and the dispatching means in accordance with the variation in the positions of the actual position selectors from the positions of the desired-position selectors.

24. In an elevator system for operating a car serving a plurality of floors, the combination of a desired-position selector for the car, a motor for operating the desired-position selector, a generator for supplying electric energy to the motor at a predetermined voltage, a motor operated rheostat for the generator, an actual position selector for the car, means connecting the actual position selector for operation by the car in accordance with the actual position of the car, and a comparative means responsive to the relative positions of the actual selector and the desired-position selector for actuating the motor operated rheostat to modify the voltage of the generator and thereby modify the speed of the desired-position selector when the car gets ahead of or behind the desired-position selector.

25. In an elevator system for operating a car serving a plurality of floors, the combination of a desired-position selector for the car, a motor for operating the desired-position selector, a dispatcher operable at a predetermined speed for giving dispatching signals to the car at predetermined intervals, a generator for supplying electric energy to the motor at a predetermined voltage, a motor operated rheostat for the generator, an actual position selector for the car, means connecting the actual position selector for operation by the car in accordance with the actual position of the car, a comparative means responsive to the relative positions of the actual selector and the desired-position selector for actuating the motor operated rheostat to modify the voltage of the generator and thereby modify the speed of the desired-position selector when the car moves ahead of or behind the desired-position selector, and for causing the dispatcher to operate at less than its predetermined speed when the car is behind its schedule and to operate at a speed greater than its predetermined speed when the car is ahead of its schedule.

26. In an elevator system for operating a plurality of cars serving a plurality of floors, the combination of a plurality of desired-position floor selectors, one for each car, a motor for each desired-position selector, a dispatcher for giving dispatching signals to the cars, a generator for supplying electric energy at a predetermined voltage to the motors and to the dispatcher to cause them to operate at predetermined speeds, a plurality of actual position selectors, one for each car, each actual selector being connected to its car for operation in accordance with the actual position of the car, a comparative means for each car responsive to the relative positions of the actual selector and the desired-position selector of that car for controlling the generator to decrease the predetermined voltage to the motors and the dispatcher when the car is behind its schedule and to increase the predetermined voltage to the motors and the dispatcher when the car is ahead of its predetermined schedule to cause the desired-position selectors to be moved in accordance with the ability of the cars to keep up with their desired schedules.

27. In an elevator system for operating a plurality of cars in serving a plurality of floors, the combination of a plurality of desired-position selectors, one for each car, a motor for each selector, an "up" generator for supplying electric energy at a predetermined voltage to the motors for "up" direction operation, a "down" generator for supplying energy to the motors at a predetermined voltage for "down" operation, a rheostat for controlling the voltages of the generators, a plurality of actual position selectors, one for each car, connected for operation by the car to be moved in accordance with the position of the car, a plurality of comparing means, one for each car, responsive to the relative positions of the actual position selectors and the desired-position selectors for operating the rheostat to control the operation of the "up" generator and the "down" generator to thereby modify the predetermined voltages supplied to the motors of the desired-position selectors whereby the speed of the desired-position selectors is modified in accordance with the ability of the cars to maintain their desired schedules.

28. In an elevator system for operating a car serving a plurality of floors, the combination of a desired-position selector for the car, a motor for operating the desired-position selector to indicate the desired schedule of the car, an "up" generator having a field winding for supplying a predetermined voltage to the motor when the car is making an "up" trip, a "down" generator having a field winding for supplying a predetermined voltage to the motor when the car is making a "down" trip, means responsive to the direction of operation of the car for connecting the motor to operate the desired-position selector in the direction of operation of the car, a rheostat for varying the strength of the "up" field winding and the strength of the "down" field winding, an "up" manually adjustable means for causing the rheostat to vary the predetermined voltage of the "up" generator, a "down" manually adjustable means for causing the rheostat to vary the strength of the "down" generator field, an actual position selector connected for operation by the car in accordance with the actual position of the car, and a comparative means responsive to the relative position of the actual selector and the desired-position selector for causing the rheostat to vary the strength of the generator field windings and thereby cause the operation of the desired position selector to be modified in accordance with the ability of the car to keep up with its schedule.

29. In an elevator system for operating a car serving a plurality of floors, the combination of a desired-position selector for the car, a motor for operating the desired-position selector to indicate the desired schedule of the car, a dispatcher for giving dispatching signals to the car at predetermined intervals, an "up" generator having a field winding for supplying a predetermined voltage to the motor when the car is making an "up" trip, a "down" generator having a field winding for supplying a predetermined voltage to the motor when the car is making a "down" trip, means responsive to the direction of operation of the car for connecting the motor to operate the desired-position selector in the direction of operation of the car, a rheostat for varying the strength of the "up" field winding and the strength of the "down" field winding, an "up" manually adjustable means for causing the rheostat to vary the predetermined voltage of the "up" generator field, a "down" manually adjustable means for causing the rheostat to vary the strength of the "down" generator field, an actual position selector connected for operation by the car in accordance with the actual position of the car, and a comparative means responsive to the relative positions of the actual selector and the desired-position selector for causing the rheostat to vary the strength of the generator fields and thereby cause the operation of the desired-position selector to be modified in accordance with the ability of the car to keep up with its schedule, and for modifying the action of the dispatching means to cause it to give its dispatching signals at a rate in keeping with the ability of the car to keep up to its schedule.

30. In an elevator system for operating a plurality of cars serving a plurality of floors, the combination of a plurality of desired-position selectors, one for each car, a motor for operating each selector to determine a desired position for the car with which it is associated, a dispatching means for giving dispatching signals to the cars, means responsive to the position of the cars and to the operation of the dispatching system for selecting a car at the dispatching floor and giving it a next signal to be next to receive a dispatching signal to leave the dispatching floor, and means responsive to the operation of the "next" signal means for a car for connecting the desired-position selector motor for that car to a source of energy to cause it to start the selector of that car on a trip away from the dispatching floor.

31. In an elevator system for operating a plurality of cars serving a plurality of floors, the combination of a plurality of desired-position selectors, one for each car, a motor for operating each selector to determine the desired position of the car with which it is associated, a dispatching means for giving dispatching signals to the cars, means responsive to the position of the cars and to the operation of the dispatching system for selecting a car at the dispatching floor and giving it a next signal to be next to receive a dispatching signal to leave the dispatching floor, and means responsive to the operation of the "next" signal means for a car for connecting the desired-position selector motor for that car to a source of energy to cause it to start the selector of that car on a trip from the dispatching floor, means responsive to the arrival of the operated selector at its terminal away from the dispatching floor for reversing the connection of its motor to start the selector on its return trip, and means responsive to the arrival of the selector at the dispatching floor for disconnecting its motor from its source of energy.

32. In an elevator system having a car serving a plurality of floors, the combination of a desired-position floor selector for the car, means for operating the selector at a predetermined speed to indicate the desired-position for the car, a plurality of stop call registering devices, one for each floor, and means responsive to a predetermined number of stop call registering devices being in operated condition for changing the speed of the selector.

33. In an elevator system having a car serving a plurality of floors, the combination of a desired-position floor selector for the car, means for operating the selector at a predetermined speed to indicate the desired position for the car, means responsive to conditioning of the car to start a trip for starting the selector operating means for a round trip of the car and responsive to the car completing that trip for stopping the selector operating means, a plurality of stop call registering devices, one for each floor, and means responsive to a predetermined number of stop call registering devices being in operated condition for changing the speed of the selector operating means.

34. In an elevator system for operating a plurality of cars serving a plurality of floors, the combination of a plurality of desired-position floor selectors, one for each car, means for operating the selector for each car at a predetermined speed to indicate the desired position for that car, a plurality of stop call registering devices, one for each floor common to all the cars, and means responsive to a predetermined number of stop call registering devices being in operated condition for changing the speed of the operating means for the selectors.

35. In an elevator system for operating a plurality of cars serving a plurality of floors, the combination of a plurality of desired-position floor selectors, one for each car, means for operating each selector at a predetermined speed to indicate the desired position of its car, a plurality of down stop call registering devices common to all the cars, one for each floor, and means responsive to a predetermined number of down stop call registering devices being in operated condition for decreasing the speed of the operating means of the selector associated with each down running car.

36. In an elevator system for operating a plurality of cars serving a plurality of floors, the combination of a plurality of desired-position floor selectors, one for each car, means for operating each selector at a predetermined speed to indicate the desired position of its car, a means associated with each car and responsive to conditioning of that car to start a round trip for starting the operating means for the selector of that car and responsive to that car completing that trip for stopping the operating means associated with its selector, a plurality of stop call registering devices common to all the cars, one device for each floor, and means responsive to a predetermined number of stop call registering devices being in operated condition for changing the speed of the selector operating means for each down running car.

37. In an elevator system for operating a plurality of cars serving a plurality of floors, the combination of a plurality of desired-position floor selectors, one for each car, means for operating each selector at a predetermined speed to indicate the desired position for the car associated therewith, a dispatching means for giving dispatching signals to the cars, means for operating the dispatching means at a predetermined speed, a plurality of stop call registering devices common to all the cars, one for each floor, and means responsive to a predetermined number of stop call registering devices being in operated condition for changing the predetermined speed of each selector and for changing the predetermined speed of the dispatcher operating means.

38. In an elevator system for operating a plurality of cars serving a plurality of floors, the combination of a plurality of actual position floor selectors, one for each car, connected to that car for operation in accordance with the actual position of that car, a plurality of desired-position floor selectors, one for each car, means for operating each desired-position selector at a predetermined speed to indicate the desired position of the car, a dispatching means for giving dispatching signals to the cars, means for operating the dispatching means at a predetermined speed, means responsive to the comparative positions of the actual selector and the desired-position selector of each car for changing the speed of the desired-position selector operating means and the operating means for the dispatching means, a plurality of down stop call registering devices common to all of the cars, one for each floor, and means responsive to a predetermined number of the down call registering devices being in operated condition for decreasing the predetermined speed of the desired-position selector operating means of each down running car and for decreasing the speed of the dispatching operating means.

39. In an elevator system for operating a plurality of cars serving a plurality of floors, an actual position selector individual to each car connected for operation by that car in accordance with the actual position of that car, a plurality of desired-position selectors, one for each car, means for operating each of the desired-position selectors at a predetermined speed to set a desired schedule for the car with which it is associated, a non-rotational dispatcher for giving dispatching signals to the cars, a comparing means, individual to each car, responsive to the relative positions of the actual selector and the desired-position selector of that car for modifying the speed of the operating means for the desired-position selectors so that their predetermined speed will conform more or less with the ability of the cars to keep up with the desired-position selectors and to modify the speed of the non-rotational dispatching means to cause the dispatching signals to be given at intervals conforming to the ability of the cars to keep up with their desired-position selectors.

40. In an elevator system for operating a plurality of cars over a plurality of floors, an actual position selector for each car connected to be operated in accordance with the actual position of that car, a desired-position selector for each car, means for operating each desired-position selector at a predetermined speed to set a desired schedule for its car, means responsive to the arrival of a car at the dispatching floor for causing it to receive a signal that it is to be the next car to leave, a dispatching impulser, means for operating the impulser at a predetermined speed to give a dispatching impulse to that car selected as the next car to receive the dispatching signal, and comparing means responsive to the relative positions of the desired-position selectors and the actual position selectors for increasing the speed of the dispatching impulser when the cars get ahead of their schedules and for decreasing the speed of the impulser when the cars get behind their schedules.

HAROLD W. WILLIAMS.
EDGAR M. BOUTON.
DANILO SANTINI.
WILLIAM F. EAMES.